(12) United States Patent
Murakami

(10) Patent No.: US 12,103,535 B2
(45) Date of Patent: Oct. 1, 2024

(54) DEVICE AND METHOD FOR GENERATING TRAVEL TRAJECTORY DATA IN INTERSECTION, AND VEHICLE-MOUNTED DEVICE

(71) Applicant: DENSO CORPORATION, Kariya (JP)

(72) Inventor: Kunio Murakami, Kariya (JP)

(73) Assignee: DENSO CORPORATION, Kariya (JP)

( * ) Notice: Subject to any disclaimer, the term of this patent is extended or adjusted under 35 U.S.C. 154(b) by 606 days.

(21) Appl. No.: 17/186,945

(22) Filed: Feb. 26, 2021

(65) Prior Publication Data

US 2021/0182575 A1    Jun. 17, 2021

Related U.S. Application Data

(63) Continuation of application No. PCT/JP2019/033514, filed on Aug. 27, 2019.

(30) Foreign Application Priority Data

Aug. 31, 2018 (JP) ................................. 2018-163073
Aug. 9, 2019  (JP) ................................. 2019-147339

(51) Int. Cl.
| | | |
|---|---|---|
| *B60W 30/18* | (2012.01) | |
| *B60W 60/00* | (2020.01) | |
| *G06V 10/56* | (2022.01) | |
| *G06V 10/80* | (2022.01) | |
| *G06V 20/10* | (2022.01) | |
| *G06V 20/56* | (2022.01) | |
| *G06V 20/58* | (2022.01) | |

(52) U.S. Cl.
CPC .... *B60W 30/18159* (2020.02); *B60W 60/001* (2020.02); *G06V 10/56* (2022.01); *G06V 10/811* (2022.01); *G06V 20/182* (2022.01); *G06V 20/584* (2022.01); *G06V 20/588* (2022.01)

(58) Field of Classification Search
CPC .......... B60W 30/18159; B60W 60/001; G06V 10/56; G06V 10/811; G06V 20/182; G06V 20/584; G06V 20/588; G06F 18/256
See application file for complete search history.

(56) References Cited

U.S. PATENT DOCUMENTS

| | | | |
|---|---|---|---|
| 2008/0015775 A1 | 1/2008 | Guo et al. | |
| 2008/0208460 A1* | 8/2008 | Nakao ................ | G01C 21/3658 701/532 |
| 2010/0169013 A1* | 7/2010 | Nakamura .......... | G08G 1/0969 701/469 |

(Continued)

FOREIGN PATENT DOCUMENTS

| | | |
|---|---|---|
| DE | 102007011276 A1 | 9/2008 |
| JP | 2009-110343 A | 5/2009 |

(Continued)

*Primary Examiner* — Christopher M Brandt
(74) *Attorney, Agent, or Firm* — MASCHOFF BRENNAN

(57) ABSTRACT

In a device for generating travel trajectory data in an intersection, a road marking recognizer is configured to recognize a road marking in the intersection using captured image data of the intersection. A travel trajectory data generator is configured to, in response to a result of recognition by the road marking recognizer, generate travel trajectory data that is data enabling specification of a travel trajectory in the intersection for autonomous driving.

14 Claims, 19 Drawing Sheets

(56) References Cited

U.S. PATENT DOCUMENTS

| | | | | |
|---|---|---|---|---|
| 2018/0156626 A1* | 6/2018 | Kang | ................... | G06V 10/56 |
| 2019/0113351 A1* | 4/2019 | Antony | ................... | B62D 1/00 |
| 2019/0210643 A1* | 7/2019 | Matsumoto | ............ | B62D 5/046 |
| 2019/0278280 A1* | 9/2019 | Imai | ..................... | B60W 30/09 |
| 2019/0329771 A1* | 10/2019 | Wray | ................... | G08G 1/166 |
| 2020/0255033 A1* | 8/2020 | Matsunaga | ..... | B60W 30/18154 |
| 2021/0221367 A1* | 7/2021 | Hiramatsu | ........ | B60W 30/0956 |

FOREIGN PATENT DOCUMENTS

| | | |
|---|---|---|
| JP | 2010-026875 A | 2/2010 |
| JP | 2013-120517 A | 6/2013 |
| JP | 2013-185893 A | 9/2013 |
| JP | 2017-097088 A | 6/2017 |
| JP | 2018-112989 A | 7/2018 |

\* cited by examiner

DEVICE AND METHOD FOR GENERATING TRAVEL TRAJECTORY DATA IN INTERSECTION, AND VEHICLE-MOUNTED DEVICE

CROSS-REFERENCE TO RELATED APPLICATION

The present application is based on Japanese Patent Application No. 2018-163073 filed Aug. 31, 2018, and Japanese Patent Application No. 2019-147339 filed Aug. 9, 2019, the descriptions of which are incorporated herein by reference.

BACKGROUND

Technical Field

This disclosure relates to a device and a method for generating travel trajectory data in an intersection, and a vehicle-mounted device.

Related Art

There is a technique for accurately measuring a shape and a location of a road using a special-purpose vehicle and generating travel trajectory data for autonomous driving. In principle, this technique needs expensive sensors and considerable amounts of human work, and can only generate travel trajectory data related to a limited extent, such as a freeway, a car-only road and the like. Travel trajectory data related to an open road can not be generated and thus travel trajectory data in or within an intersection can not be generated. In view of the foregoing, it is desired to have a technique for generating travel trajectory data in an intersection.

DESCRIPTION OF SPECIFIC EMBODIMENTS

For example, JP-A-2017-97088 discloses a technique for estimating a new road using a GPS trajectory that indicates a Global Positioning System (GPS) location of a vehicle as an absolute trajectory, and estimating a connection between the estimated new road and an existing road, and thereby updating a map data. In addition, for example, JP-A-2010-26875 discloses a technique for connecting an entering lane that enters an intersection and an existing lane that exits from the intersection with a circular arc (e.g., a quadratic Bezier curve) to generate travel trajectory data in the intersection.

There is an issue with the technique disclosed in JP-A-2017-97088 that large variations in GPS location may reduce the accuracy of the travel trajectory data. In addition, there is an issue with the technique disclosed in JP-A-2010-26875 that since there are a variety of travel trajectories of vehicles depending on intersection shapes, the travel trajectory data is likely to deviate from the actual travel trajectory and thus impractical.

In view of the foregoing, it is desired to have a technique for appropriately generating travel trajectory data that is data enabling specification of a travel trajectory in an intersection for autonomous driving.

According to one aspect of the present disclosure, a road marking recognizer is configured to recognize a road marking in an intersection using captured image data of the intersection. A travel trajectory data generator is configured to, in response to a result of recognition by the road marking recognizer, generate travel trajectory data that is data enabling specification of a travel trajectory in the intersection for autonomous driving.

A road marking in an intersection is recognized using captured image data of the intersection. Travel trajectory data that is data enabling specification of a travel trajectory in the intersection for autonomous driving is generated in response to a result of recognition. Where a road marking actually exists on a road in an intersection, travel trajectory data is generated in response to the actually existing road marking, which enables appropriate generation of the travel trajectory data in the intersection for autonomous driving.

Figure 1:
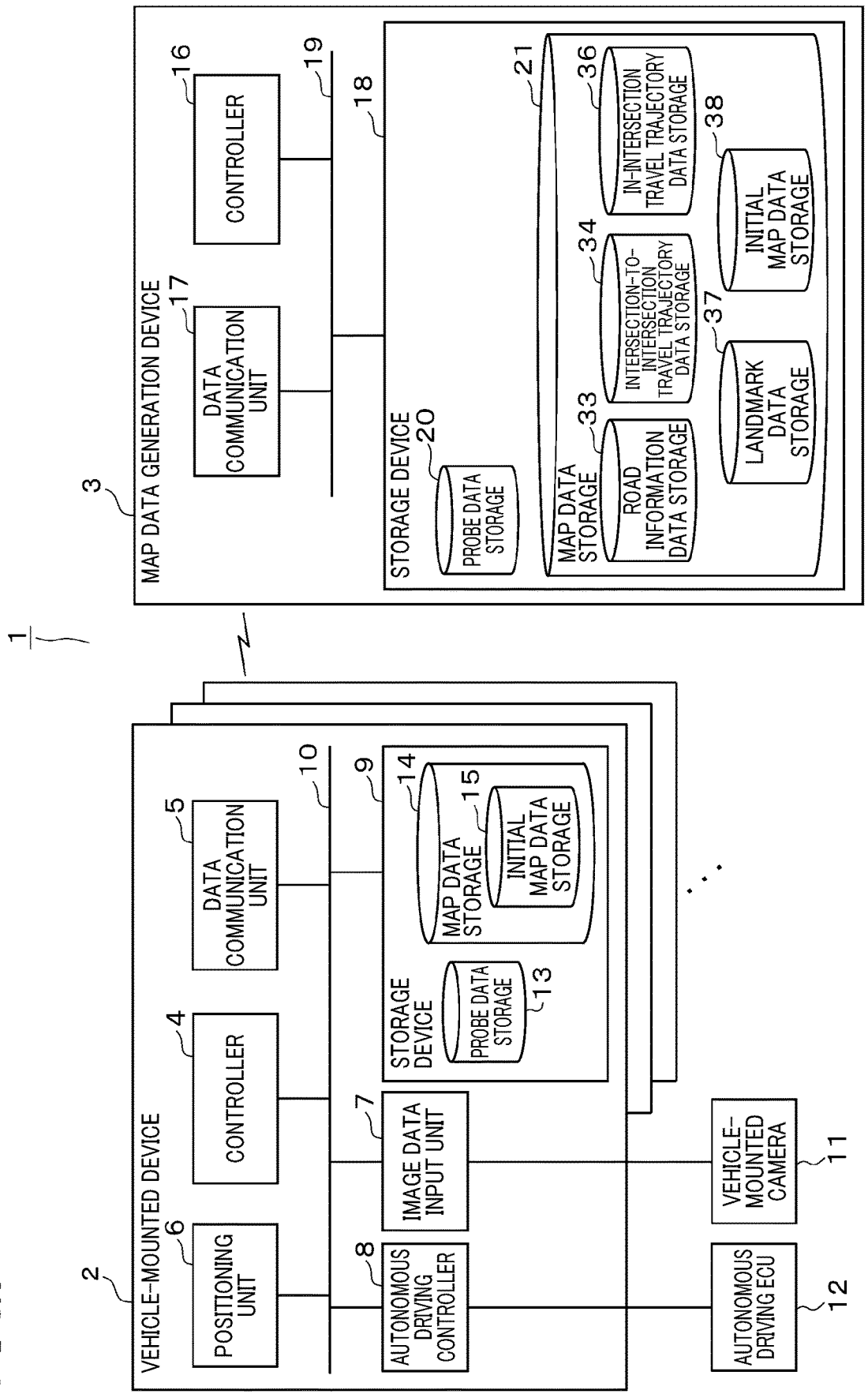
FIG. 1 is a functional block diagram of the overall configuration of one embodiment.

Hereinafter, one embodiment will be described with reference to the accompanying drawings. In the map data generation system 1, as illustrated in FIG. 1, a vehicle-mounted device 2 mounted to each vehicle and a map data generation device 3 located on the network side are data communicatively connected via the communication network. There is a many-to-one relationship between the vehicle-mounted devices 2 and the map data generator 3. The map data generation device 3 is able to data-communicate with a plurality of the vehicle-mounted devices 2.

The vehicle-mounted device 2 includes a controller 4, a data communication unit 5, a positioning unit 6, an image data input unit 7, an autonomous driving controller 8, and a storage device 9. These functional blocks are data communicatively connected via an internal bus 10. The controller 4 is configured as a microcomputer including a central processing unit (CPU), a read only memory (ROM), a random access memory (RAM), and input/output interface (I/O). The controller 4 is configured to perform processes corresponding to the computer programs by executing the computer programs stored in the non-transitory tangible storage medium, thereby controlling the overall operations of vehicle-mounted device 2.

The data communication unit 5 controls data communication with the map data generation device 3. The positioning unit 6 includes a Global Positioning System (GPS) receiver, an acceleration sensor, a geomagnetic sensor, and others, and determines a current location of the vehicle-mounted device 2 and outputs positioning data indicating the current location and a time of day of positioning to the controller 4. The vehicle-mounted camera 11 is installed separately from the vehicle-mounted device 2 and captures images of, for example, forward scenes of the vehicle, and outputs captured image data as vehicle image data to the vehicle-mounted device 2. Upon receipt of the vehicle image data from the vehicle-mounted camera 11, the image data input unit 7 outputs the received vehicle image data to the controller 4. The vehicle-mounted camera 11 is not limited to the camera for capturing images of the forward scenes of the vehicle. The vehicle-mounted camera 11 may be a camera for capturing images of rear scenes or side scenes of the vehicle. The camera for capturing images of rear scenes or side scenes of the vehicle is attached to the vehicle body with a larger depression angle than the camera that captures images of forward scenes of the vehicle, which can provide advantages of easy acquisition of clear image data. Alternatively, a plurality of the cameras that capture images of forward scenes, rear scenes, and side scenes of the vehicle may be employed.

The autonomous driving controller 8 is configured to, upon receipt of a control signal from the controller 4, control the operations of the autonomous driving electronic control unit (ECU) 12 and control autonomous driving of the vehicle.

The storage device 9 includes a probe data storage 13 storing probe data and a map data storage 14 storing map data. The map data storage 14 includes an initial map data storage 15 storing initial map data described later. The initial map data includes travel trajectory data that indicates travel trajectories when the vehicle actually travels using the autonomous driving function. The autonomous driving controller 8 controls the autonomous driving of the vehicle using the travel trajectory data included in the initial map data. The autonomous driving controller 8 estimates a position and an orientation of the vehicle in an intersection using, for example, image data captured by the vehicle-mounted camera 11 and causes the vehicle to travel along the travel trajectory indicated by the travel trajectory data. The position and the orientation of the vehicle in the intersection are determined based on installation information, such as sizes and degrees of tilt of a plurality of landmarks included in the image data captured by the vehicle-mounted camera 11 using, for example, an optical navigation technique. With such a configuration, the position and the orientation of the vehicle can be estimated more accurately as compared with when the GPS positioning result or a result of a dead reckoning process is used as it is. The landmarks will be described later.

The controller 4 associates the positioning data received from the positioning unit 6 with the vehicle image data received from the image data input unit 7, and regularly stores the probe data including the associated positioning data and the vehicle image data in the probe data storage 13. Every predetermined time interval or every time the traveled distance of the vehicle reaches a predetermined distance, the controller 4 reads the probe data from the probe data storage 13 and transmits the read probe data from the data communication unit 5 to the map data generation device 3. In addition, upon the data communication unit 5 receiving the initial map data delivered from device 3, the controller 4 stores the received initial map data in the initial map data storage 15.

The map data generation device 3 includes a controller 16, a data communication unit 17, and a storage device 18. These functional blocks are data communicatively connected via an internal bus 19. The controller 16 is configured as a microcomputer including a central processing unit (CPU), a read only memory (ROM), a random access memory (RAM), and input/output interface (I/O). The controller 16 is configured to perform processes corresponding to the computer programs by executing the computer programs stored in the non-transitory tangible storage medium, thereby controlling the overall operations of the map data generation device 3. The computer programs to be executed by the controller 16 includes a travel trajectory data generation program.

The data communication unit 17 controls data communication with the vehicle-mounted device 2. The storage device 18 includes a probe data storage 20 storing probe data and a map data storage 21 storing map data. The map data storage 14 includes a road information data storage 33 storing road information data described later, an intersection-to-intersection travel trajectory data storage 34 storing intersection-to-intersection travel trajectory data, and an in-intersection travel trajectory data storage 36 storing travel trajectory data in intersections, a landmark data storage 37 storing landmark data, and an initial map data storage 38 storing initial map data.

Upon the data communication unit 17 receiving the probe data transmitted from the vehicle-mounted device 2, the controller 16 stores the received probe data in the probe data storage 20. Upon the controller 16 generating the initial map data described later, the controller 16 causes the data communication unit 17 to deliver the generated initial map data to the vehicle-mounted device 2. That is, since the vehicle-mounted device 2 and the map data generation device 3 are in a many-to-one relationship, the controller 16 stores plural pieces of probe data transmitted from the plurality of vehicle-mounted devices 2 in the probe data storage 20, and causes the data communication unit 17 to deliver the initial map data to the plurality of vehicle-mounted devices 2.

Figure 2:
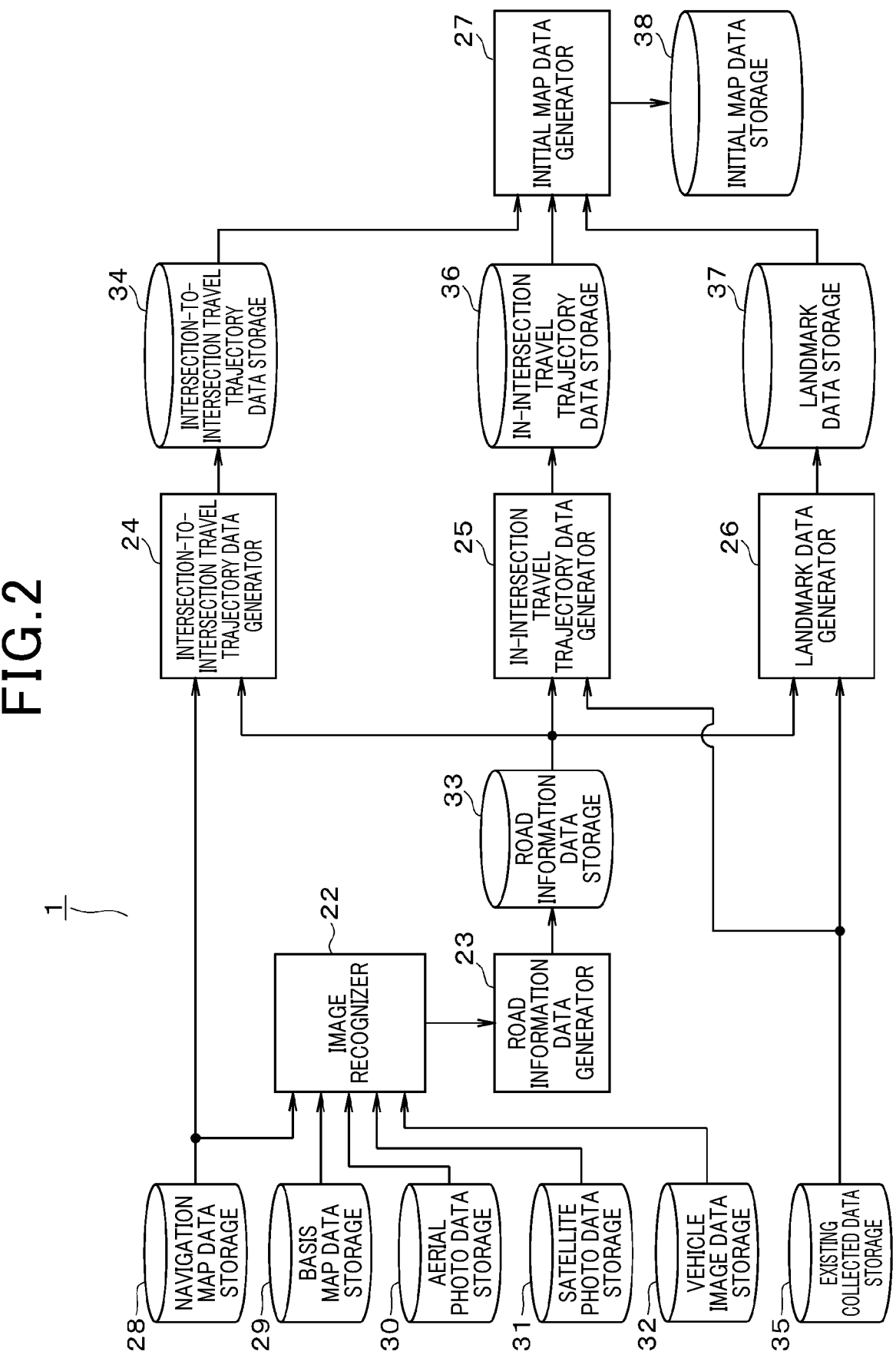
FIG. 2 is a functional block diagram of a controller of a map data generation device.

The controller 16 has a function of generating travel trajectory data. As illustrated in FIG. 2, the controller 16 includes, as functional blocks, an image recognizer 22, a road information data generator 23, an intersection-to-intersection travel trajectory data generator 24, and in-intersection travel trajectory data generator 25, a landmark data generator 26, and an initial map data generator 27.

The image recognizer 22 receives inputs of navigation map data stored in the navigation map data storage 28, basis map data stored in the basis map data storage 29, aerial photo data stored in the aerial photo data storage 30, satellite photo data stored in the satellite photo data storage 31, vehicle image data stored in vehicle image data storage 32, performs image-recognition process on these input data, and outputs a recognition result to the road information data generator 23. The navigation map is map data used in a navigation system installed in the vehicle. The basis map data is map data issued by, for example, the Geospatial Information Authority of Japan. The aerial photo data is photographic data of the ground captured by a camera mounted to an aircraft. The satellite photo data is photographic data of the ground captured by cameras mounted to the satellites. The vehicle image data is image data of road surfaces captured by the vehicle-mounted cameras 11 described above, and included in the probe data stored in the probe data storage 20.

The road information data generator 23, upon receipt of a recognition result from the image recognizer 22, generates road information data using the received recognition result. The road information data is data including a road type, such as a national road or a prefectural road, a traffic type, such as one-way traffic or two-way traffic, road-related information, such as a road width. Upon generation of the road information data, the road information data generator 23 stores the generated road information data in the road information data storage 33.

The intersection-to-intersection travel trajectory data generator 24 receives inputs of navigation map data and road information data, and uses these input data to generate intersection-to-intersection travel trajectory data. The travel trajectory data between intersections is data indicating intersection-to-intersection travel trajectories that the vehicle travels during autonomous driving. Upon generation of the intersection-to-intersection travel trajectory data, the intersection-to-intersection travel trajectory data generator 24 stores the generated travel trajectory data between intersections in the intersection-to-intersection travel trajectory data storage 34.

The in-intersection travel trajectory data generator 25 receives inputs of the existing collected data stored in the existing collected data storage 35 and the road information data, and generates the travel trajectory data in the intersection using the input data. The travel trajectory data in the intersection is data indicating a travel trajectory in the intersection that the vehicle travels during autonomous driving. Upon generating the travel trajectory data in the intersection, the in-intersection travel trajectory data generator 25 stores the generated the travel trajectory data in the intersection in the in-intersection travel trajectory data storage 36. The travel trajectory data generated by the travel trajectory data generator 25 may be any one of data indicating a virtual lane in an intersection, data used when the vehicle actually passes through an intersection during autonomous driving, and data used as terrestrial object data. That is, the travel trajectory data generated by the travel trajectory data generator 25 may be data used directly by the vehicle during autonomous driving, or may be data used indirectly by the vehicle during autonomous driving. The travel trajectory data for making a right turn corresponds to, for example, data indicating an area or a center line in an intersection, in or along which the vehicle has to travel during autonomous driving, or terrestrial objects that define the area or the center line. The travel trajectory data for making a left turn corresponds to, for example, data indicating an area or a center line in an intersection, in or along which the vehicle has to travel during autonomous driving, or terrestrial objects that define the area or the center line.

The landmark generator 26 receives inputs of existing collected data and road information data, and generates landmark data using the input data. The landmark data is data indicating installation locations, types, sizes and the like of signs and signboards on roads. The landmarks may further include traffic lights, stop lines, channelizing strips, edges of lanes, and others. Upon generating landmark data, the landmark generator 26 stores the generated landmark data in the landmark data storage 37.

The initial map data generator 27 receives inputs of the travel trajectory data between intersections stored in the intersection-to-intersection travel trajectory data storage 34, the travel trajectory data in intersections stored in the in-intersection travel trajectory data storage 36, and the landmark data stored in the landmark data storage 37 and generates initial map data using these input data. The initial map data is data integrating the travel trajectory data between intersections and the travel trajectory data in intersections. Upon generating the initial map data, the initial map data generator 27 stores the generated initial map data in the initial map data storage 38.

Figure 3:
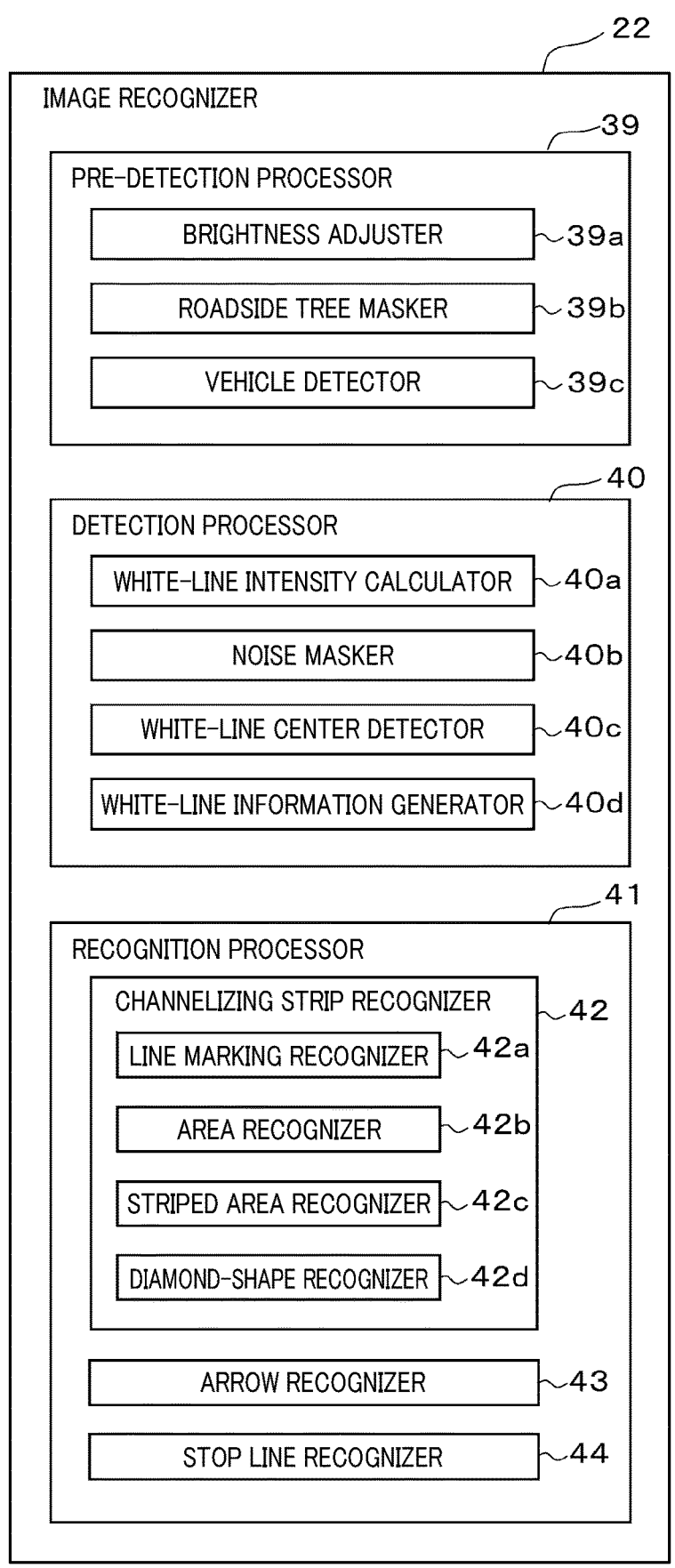
FIG. 3 is a functional block diagram of an image recognizer.
Figure 4:
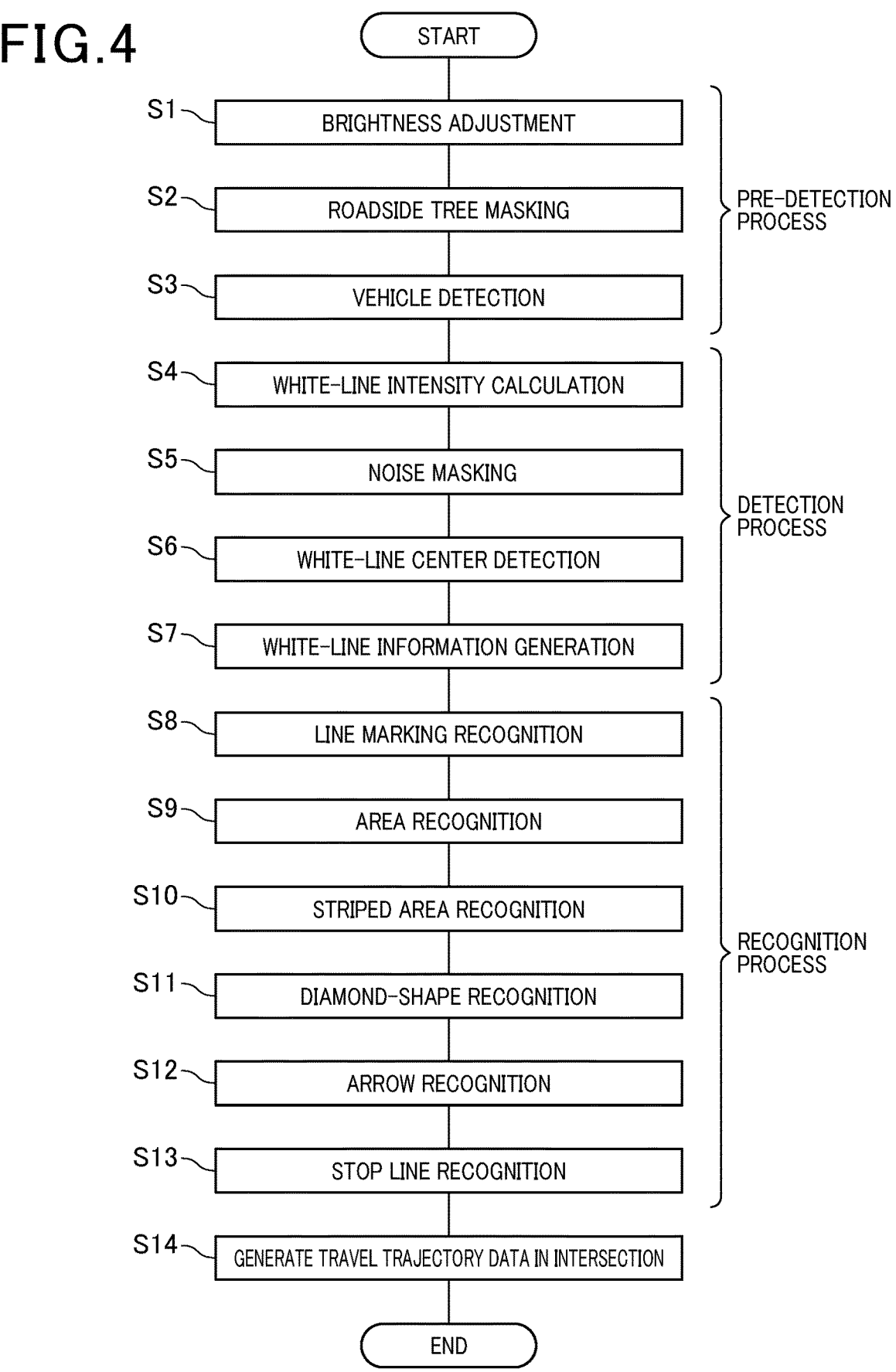
FIG. 4 is a flowchart of the overall process.

As illustrated in FIG. 3, the image recognizer 22 includes a pre-detection processor 39, a detection processor 40, and a recognition processor 41 as a configuration for generating travel trajectory data in an intersection.

The pre-detection processor 39 includes a brightness adjuster 39a, a roadside tree masker 39b, and a vehicle detector 39c. The brightness adjuster 39a adjusts the brightness of the aerial photo data, the satellite photo data, and the vehicle image data to a level suitable for image recognition. The roadside tree masker 39b masks roadside tree parts included in the aerial photo data, the satellite photo data, and the vehicle image data. The vehicle detector 39c detects vehicles included in the aerial photo data, the satellite photo data and the vehicle image data.

The detection processor 40 includes a white-line intensity calculator 40a, a noise masker 40b, a white-line center detector 40c, and a white-line information generator 40d. The white-line intensity calculator 40a determines the intensity of each white line painted on the road included in the aerial photo data, the satellite photo data, and the vehicle image data. The noise masker 40b masks noise included in the aerial photo data, the satellite photo data, and the vehicle image data. The white-line center detector 40c detects the center of each white line painted on the road included in the aerial photo data, the satellite photo data, and the vehicle image data. The white-line information generator 40d generates information, such as the intensity and the center of each white line.

The recognition processor 41 includes a channelizing strip recognizer 42 (corresponding to a road marking recognizer), an arrow recognizer 43, and a stop-line recognizer 44. The channelizing strip recognizer 42 is a functional block that uses the aerial photo data, the satellite photo data, and the vehicle image data as image data of an intersection to recognize road markings in the intersection. The channelizing strip recognizer 42 includes a line marking recognizer 42a, an area recognizer 42b, a striped area recognizer 42c, and a diamond-shape recognizer 42d. The line marking recognizer 42a recognizes line markings painted on a road in an intersection included in the aerial photo data, the satellite photo data, and the vehicle image data. The area recognizer 42b recognizes areas of specific colors (e.g., blue, red and the like that are different from the asphalt color) painted on a road in an intersection included in the aerial photo data, satellite photo data, and the vehicle image data. The striped area recognizer 42c recognizes striped areas painted on a road in an intersection included in the aerial photo data, the satellite photo data, and the vehicle image data. The diamond-shaped recognizer 42d recognizes a diamond-shaped marking painted on a road in an intersection included in the aerial photo data, the satellite photo data, and the vehicle image data. The channelizing strips are these line markings, areas of specific colors, striped areas, and diamond-shaped markings in an intersection, which are markings for guiding safe and smooth driving of vehicles in an intersection.

The arrow recognizer 43 recognizes arrows painted on a road in an intersection, included in the aerial photo data, the satellite photo data, and the vehicle image data. The stop line recognizer 44 recognizes stop lines painted on a road in an intersection, included in the aerial photo data, the satellite photo data, and the vehicle image data.

Operations of the above-described configuration will now be described with reference to FIGS. 4-19.

The controller 16 sequentially performs a pre-detection process, a detection process, and a recognition process in the image recognizer 22, and performs a travel trajectory data generation process in the in-intersection travel trajectory data generator 25. The controller 16 performs, as the pre-detection process, brightness adjustment (at S1), roadside tree masking (at S2), and vehicle detection (at S3) on the aerial photo data, the satellite photo data, and the vehicle image data. Upon completing the pre-detection process, the controller 16 performs, as the detection process, white-line intensity calculation (at S4), noise masking (at S5), white-line center detection (at S6), and white-line information generation (at S7) on the aerial photo data, the satellite photo data, and the vehicle image data that were processed in the pre-detection process.

Upon completion of the detection process, the controller 16 performs, as a recognition process, channelizing strip recognition (at S8 to S11 corresponding to a channelizing strip recognition procedure) on the aerial photo data, the satellite photo data, and the vehicle image data that were processed in the detection process. That is, the controller 16 performs line marking recognition (at S8) to recognize line markings painted on a road in an intersection, and performs area recognition (at S9) to recognize areas of specific colors painted on a road in an intersection. The controller 16 performs striped area recognition (at S10) to recognize striped areas painted on a road in an intersection, and performs diamond-shape recognition (at S11) to recognize diamond-shaped markings painted on a road in an intersection. Subsequently to the channelizing strip recognition, the controller 16 performs arrow recognition (at S12) to recognize arrows painted on a road in an intersection, and performs stop-line recognition (at S13) to recognize stop lines painted on a road in an intersection. Then, upon completion of the recognition process, the controller 16 generates travel trajectory data in the intersection in response to a recognition result (at S13 corresponding to a trajectory data generation procedure).

The process of generating travel trajectory data will now be described with reference to FIGS. 5 to FIG. 19. In the following, it is assumed that the vehicle is traveling in an area to which a road traffic act that regulates left-hand traffic is applied. In such an area that a road traffic act that regulates the left-hand traffic is applied, the vehicle has to cross oncoming lanes to make a right turn.

Figure 5:
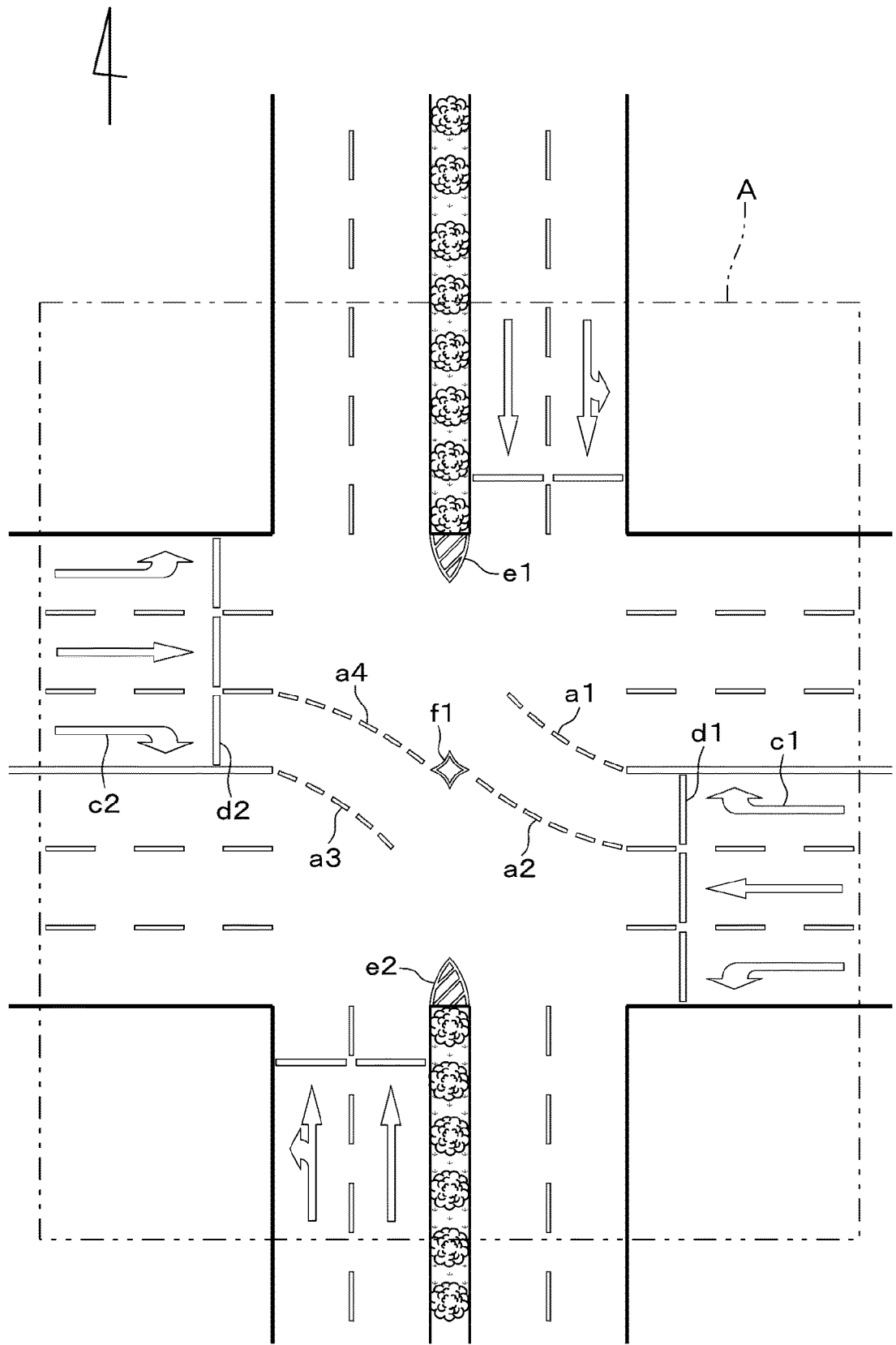
FIG. 5 is an illustration of line markings in an intersection.

(1) Process of Generating Travel Trajectory Data by Recognizing Lane Markings on a Road in an Intersection FIG. 5 illustrates an example of an intersection where the north-south direction road is a two-way road having two lanes for each direction and the east-west direction road is a two-way road having three lanes for each direction. The east-west direction road has a right turn only lane for each direction. The term "intersection" as used herein includes not only an area where the north-south direction road and the east-west direction road intersect, but also areas having arrow painted. Therefore, the intersection means a broader area (indicated by a dashed-two dotted line A in FIG. 5) than the area of the two roads intersect.

Figure 6:
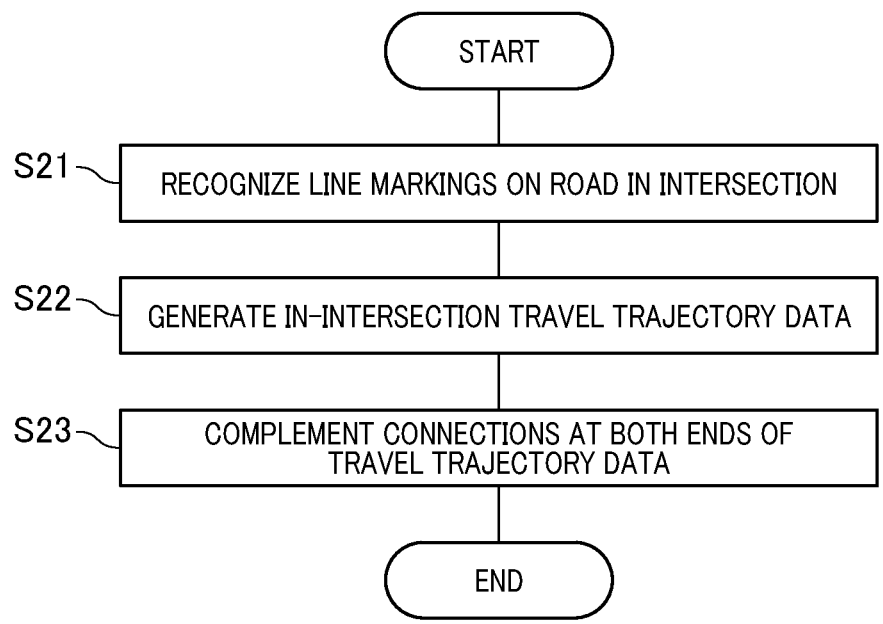
FIG. 6 is a flowchart of a process of generating travel trajectory data using line markings.

As illustrated in FIG. 6, the controller 16 performs the recognition process. Upon recognizing line markings on a road in an intersection (at S21), the controller 16 generates travel trajectory data in the intersection in response to a recognition result (at S22). Upon generating the travel trajectory data in the intersection, the controller 16 complements connections at both ends of the generated travel trajectory data such that the travel trajectory data is smoothly connected to the travel trajectory data between intersections at both the entrance-to-intersection end and exit-from-intersection end of the travel trajectory data, thereby correcting the shape and location of the travel trajectory data (at S23).

That is, where line markings a1 and a2 are painted on the road in the intersection for the right turn only lane entering the intersection from the east-direction, the controller 16 recognizes the painted line markings a1 and a2. Similarly, where markings a3 and a4 are painted on the road in the intersection for the right turn only lane that the controller 16 entering the intersection from the west-direction, the controller 16 recognizes line markings a3 and a4.

Where striped areas e1 and e2 are painted on the road in the intersection, the controller 16 recognizes the painted striped areas e1 and e2 and thus recognizes the no-entry area for the vehicle. Where a diamond-shaped marking f1 is painted on the road in the intersection, the controller 16 recognizes the diamond-shaped marking and thus recognizes an approach direction for the vehicle. Where right-turn arrows c1 and c2 are painted on the road entering the intersection, the controller 16 recognizes the painted right-turn arrows c1 and c2 and thus recognizes right-turn lanes. Where stop lines d1 and d2 are painted on the road entering the intersection, the controller 16 recognizes the painted stop lines d1 and d2 and thus recognizes stop positions in the lanes.

Figure 7:
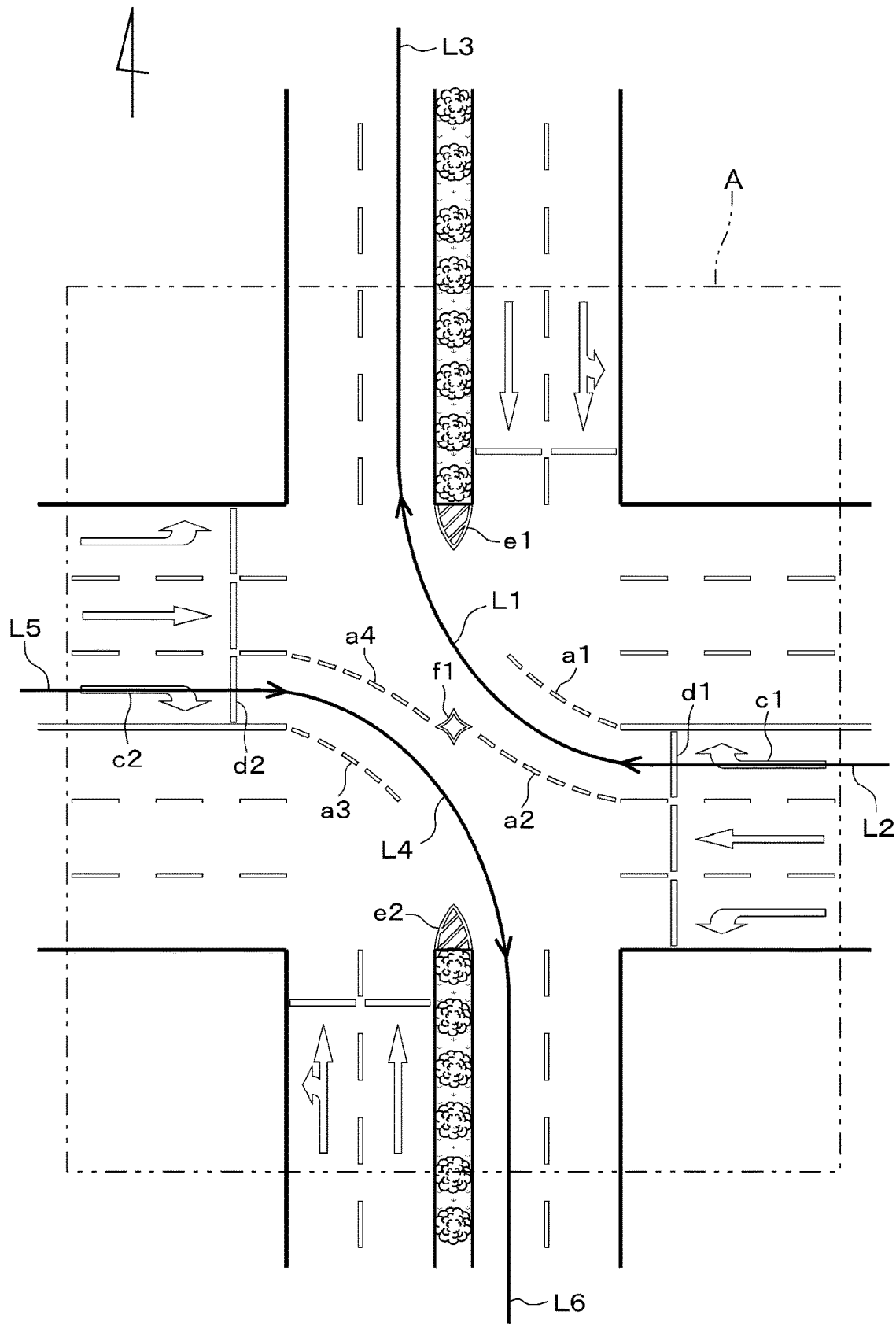
FIG. 7 is an illustration of travel trajectory data.

As illustrated in FIG. 7, upon recognizing the line markings a1 and a2 for the right turn only lane that enters the intersection from the east-direction, the controller 16 recognizes the line markings a1 and a2 and generates travel trajectory data L1 turning right within the intersection that follows the recognized line markings a1 and a2. The controller 16 may correct a position of the travel trajectory data L1 with reference to the recognized right-turn arrows or the stop lines in compliance with the traffic laws. Upon generating the travel trajectory data L1, the controller 16 complements connections at both ends of the generated travel trajectory data L1 such that the travel trajectory data L1 is smoothly connected to the travel trajectory data between intersections L2 at the entrance-to-intersection end of the travel trajectory data L1 and the travel trajectory data L1 is smoothly connected to the travel trajectory data between intersections L3 at the exit-from-intersection end of the travel trajectory data L1, thereby correcting the shape and location of the travel trajectory data L1. Any methods, such as Lagrange interpolation, Newtonian interpolation, spline interpolation or the like, may be employed to complement the connections.

Similarly, upon recognizing the line markings a3 and a4 for the right turn only lane that enters the intersection from the west-direction, the controller 16 recognizes the line markings a3 and a4 and generates travel trajectory data L4 turning right within the intersection that follows the recognized line markings a3 and a4. Upon generating the travel trajectory data L4, the controller 16 complements connections at both ends of the generated travel trajectory data L4 such that the travel trajectory data L4 is smoothly connected to the travel trajectory data between intersections L5 at the entrance-to-intersection end of the travel trajectory data L4 and the travel trajectory data L4 is smoothly connected to the travel trajectory data between intersections L6 at the exit-from-intersection end of the travel trajectory data L4, thereby correcting the shape and location of the travel trajectory data L4.

Figure 8:
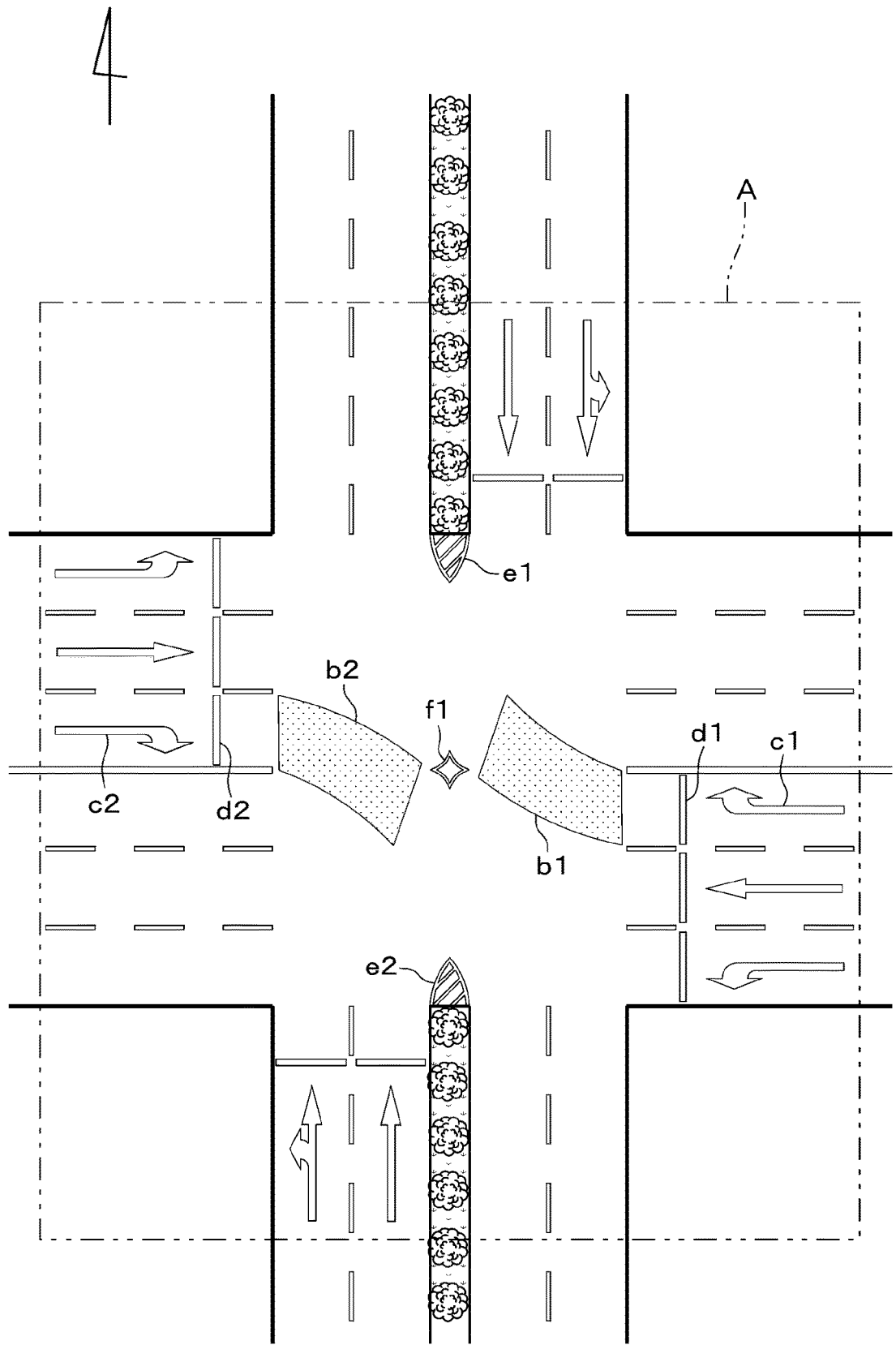
FIG. 8 is an illustration of areas of specific colors in an intersection.

(2) Process of Generating Travel Trajectory Data by Recognizing Areas of Specific Colors on a Road in an Intersection FIG. 8 illustrates an example of an intersection where the north-south direction road is a two-way road having two lanes for each direction and the east-west direction road is a two-way road having three lanes for each direction. The east-west direction road has a right turn only lane for each direction.

Figure 9:
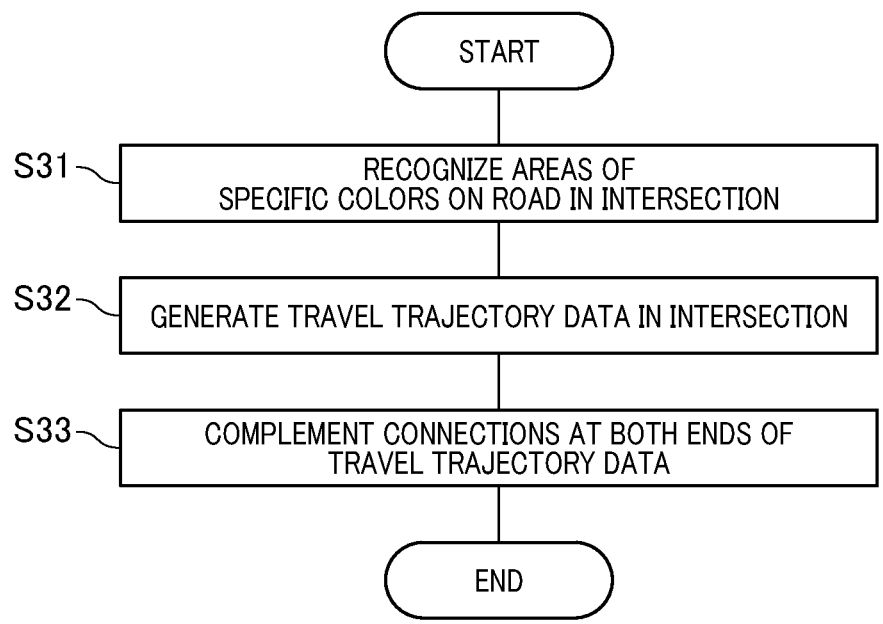
FIG. 9 is a flowchart of a process of generating travel trajectory data using areas of specific colors.

As illustrated in FIG. 9, the controller 16 performs the recognition process. Upon recognizing areas of specific colors on a road in an intersection (at S31), the controller 16 generates the travel trajectory data in the intersection in response to a recognition result (at S32). Upon generating the travel trajectory data in the intersection, the controller 16 complements connections at both ends of the generated travel trajectory data such that the travel trajectory data is smoothly connected to the travel trajectory data between intersections at both the entrance-to-intersection end and exit-from-intersection end of the travel trajectory data, thereby correcting the shape and location of the travel trajectory data (at S33).

That is, where an area of specific color b1 (indicated by a dotted area in FIG. 8) is painted on the road in the intersection for the right turn only lane entering the intersection from the east-direction, the controller 16 recognizes the painted area of specific color b1. Similarly, where an area of specific color b2 is painted on the road in the intersection for the right turn only lane that the controller 16 entering the intersection from the west-direction, the controller 16 recognizes the area of specific color b2.

Where striped areas e1 and e2 are painted on the road in the intersection, the controller 16 recognizes the painted striped areas e1 and e2 and thus recognizes the no-entry area for the vehicle. Where a diamond-shaped marking f1 is painted on the road in the intersection, the controller 16 recognizes the diamond-shaped marking and thus recognizes an approach direction for the vehicle. Where right-turn arrows c1 and c2 are painted on the road entering an intersection, the controller 16 recognizes the painted right-turn arrows c1 and c2 and thus recognizes right-turn lanes. Where stop lines d1 and d2 are painted on the road entering the intersection, the controller 16 recognizes the painted stop lines d1 and d2 and thus recognizes stop positions in the lanes.

Figure 10:
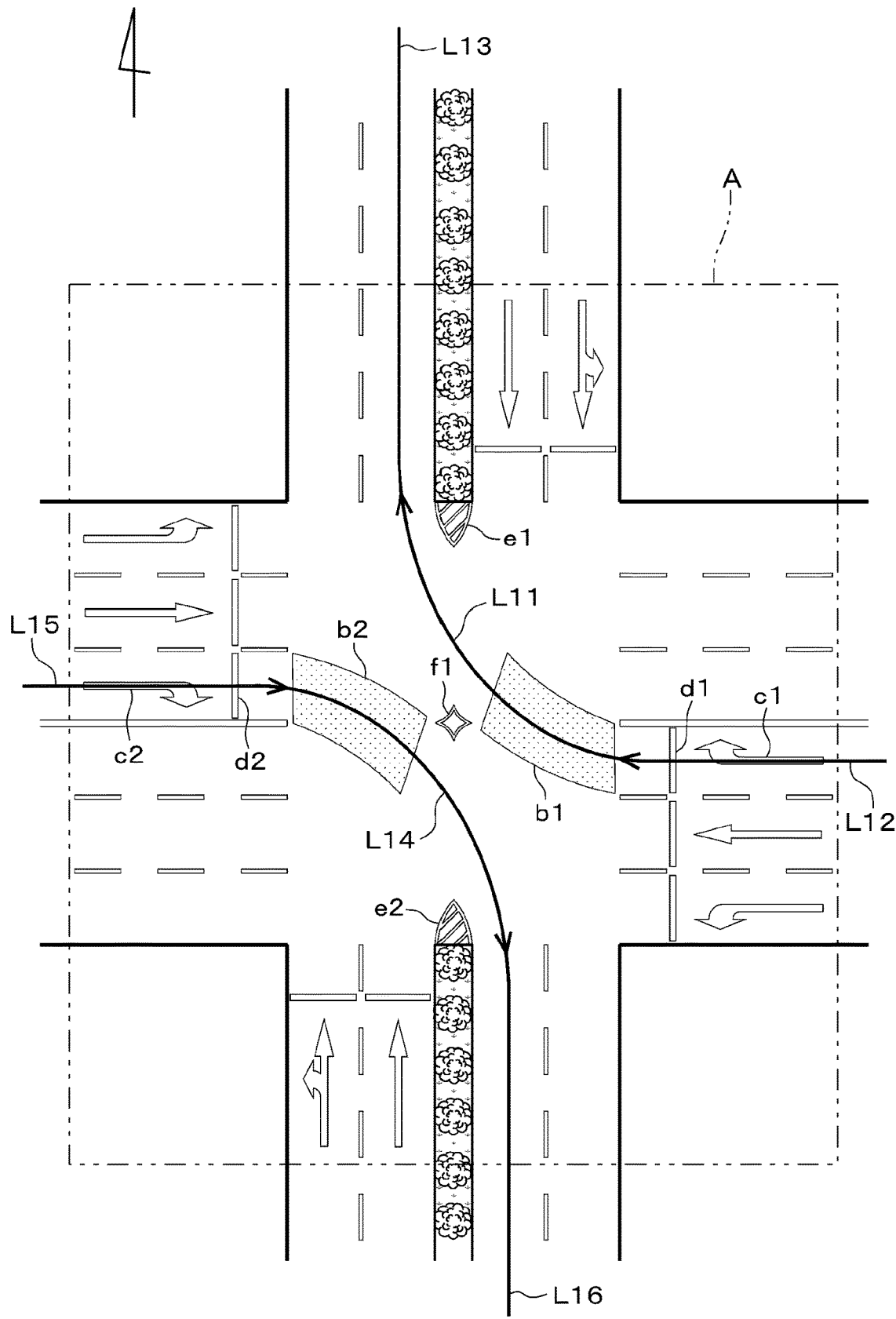
FIG. 10 is an illustration of travel trajectory data.

As illustrated in FIG. 10, upon recognizing the area of specific color b1 for the right turn only lane that enters the intersection from the east-direction, the controller 16 generates travel trajectory data L11 turning right in the intersection that follows the recognized area of specific color b1. Again, the controller 16 may correct a position of the travel trajectory data L11 with reference to the recognized right-turn arrows or the stop lines in compliance with the traffic laws. Upon generating the travel trajectory data L11, the controller 16 complements connections at both ends of the generated travel trajectory data L11 such that the travel trajectory data L11 is smoothly connected to the travel trajectory data between intersections L12 at the entrance-to-intersection end of the travel trajectory data L11 and the travel trajectory data L11 is smoothly connected to the travel trajectory data between intersections L13 at the exit-from-intersection end of the travel trajectory data L11, thereby correcting the shape and location of the travel trajectory data L1. Any methods, such as Lagrange interpolation, Newtonian interpolation, spline interpolation or the like, may be employed to complement the connections.

Similarly, upon recognizing the area of specific color b2 for the right turn only lane that enters the intersection from the west-direction, the controller 16 recognizes the area of specific color b2 and generates travel trajectory data L14 turning right within the intersection that follows the recognized area of specific color b2. Upon generating the travel trajectory data L14, the controller 16 complements connections at both ends of the generated travel trajectory data L14 such that the travel trajectory data L14 is smoothly connected to the travel trajectory data between intersections L15 at the entrance-to-intersection end of the travel trajectory data L14 and the travel trajectory data L14 is smoothly connected to the travel trajectory data between intersections L16 at the exit-from-intersection end of the travel trajectory data L14, thereby correcting the shape and location of the travel trajectory data L14.

Figure 11:
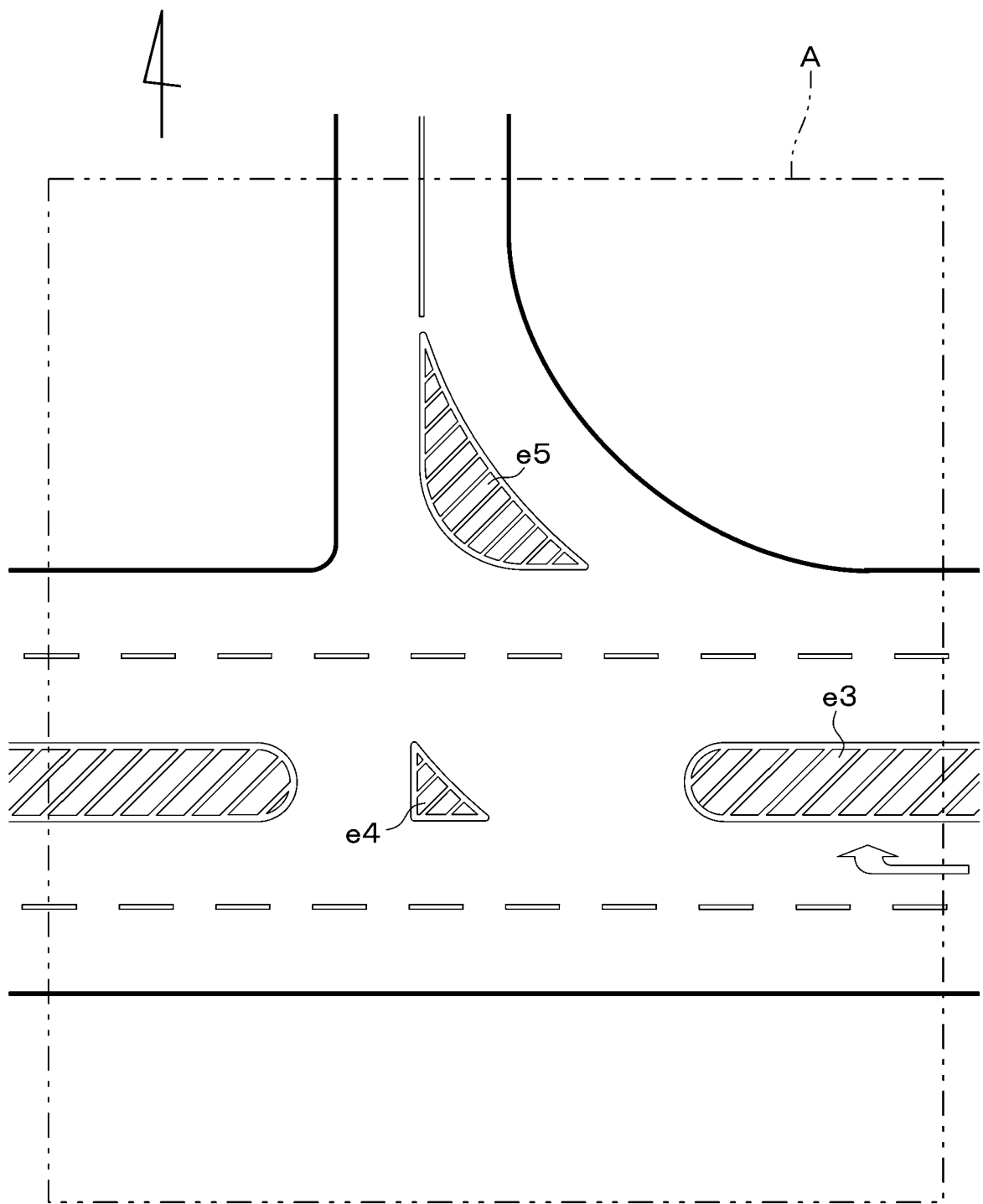
FIG. 11 is an illustration of striped areas in an intersection.

(3) Process of Generating Travel Trajectory Data by Recognizing Striped Areas on a Road in an Intersection FIG. 11 illustrates an example of a T-shaped intersection where the east-west direction road is a two-way road having two lanes for each direction and has a right turn only lane.

Figure 12:
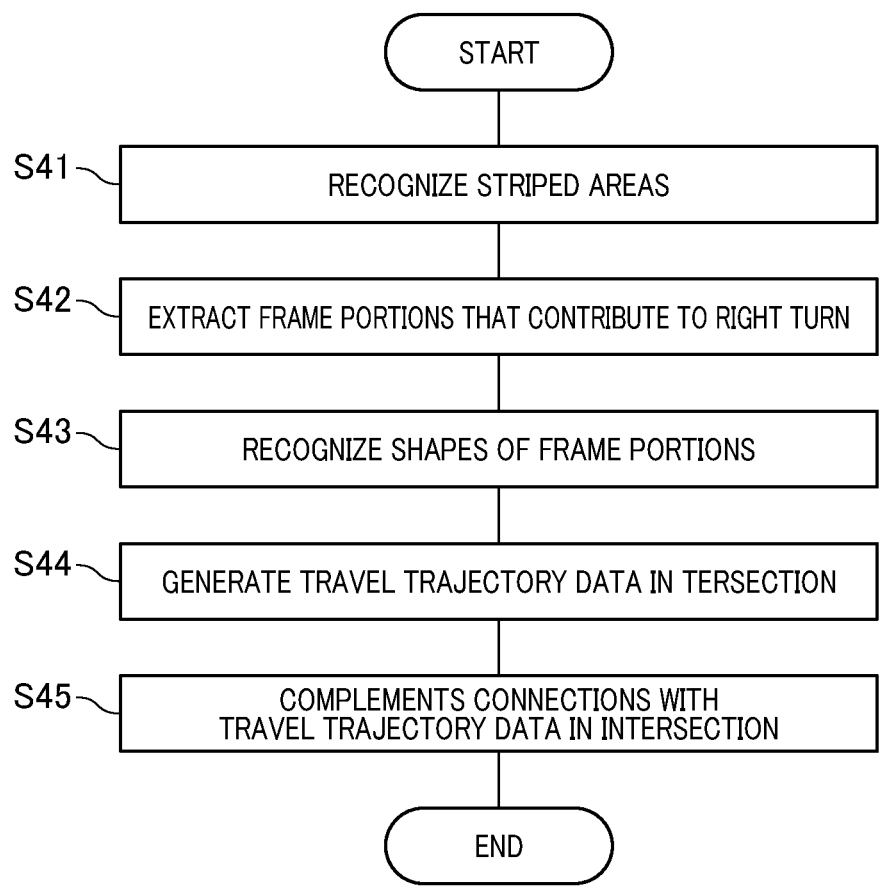
FIG. 12 is a flowchart of a process of generating travel trajectory data using striped areas.

As illustrated in FIG. 12, the controller 16 performs the recognition process. Upon recognizing striped areas on a road in an intersection (at S41), the controller 16 extracts frame portions of the recognized striped areas that contribute to a right turn (at S42). Upon extracting the frame portions of the recognized striped areas that contribute to a right turn, the controller 16 recognizes shapes of the extracted frame portions (at S43) and generates the travel trajectory data in the intersection in response to a recognition result (at S44). Upon generating the travel trajectory data in the intersection, the controller 16 complements connections at both ends of the generated travel trajectory data such that the travel trajectory data is smoothly connected to the travel trajectory data between intersections at both the entrance-to-intersection end and exit-from-intersection end of the travel trajectory data, thereby correcting the shape and location of the travel trajectory data (at S45).

Figure 13:
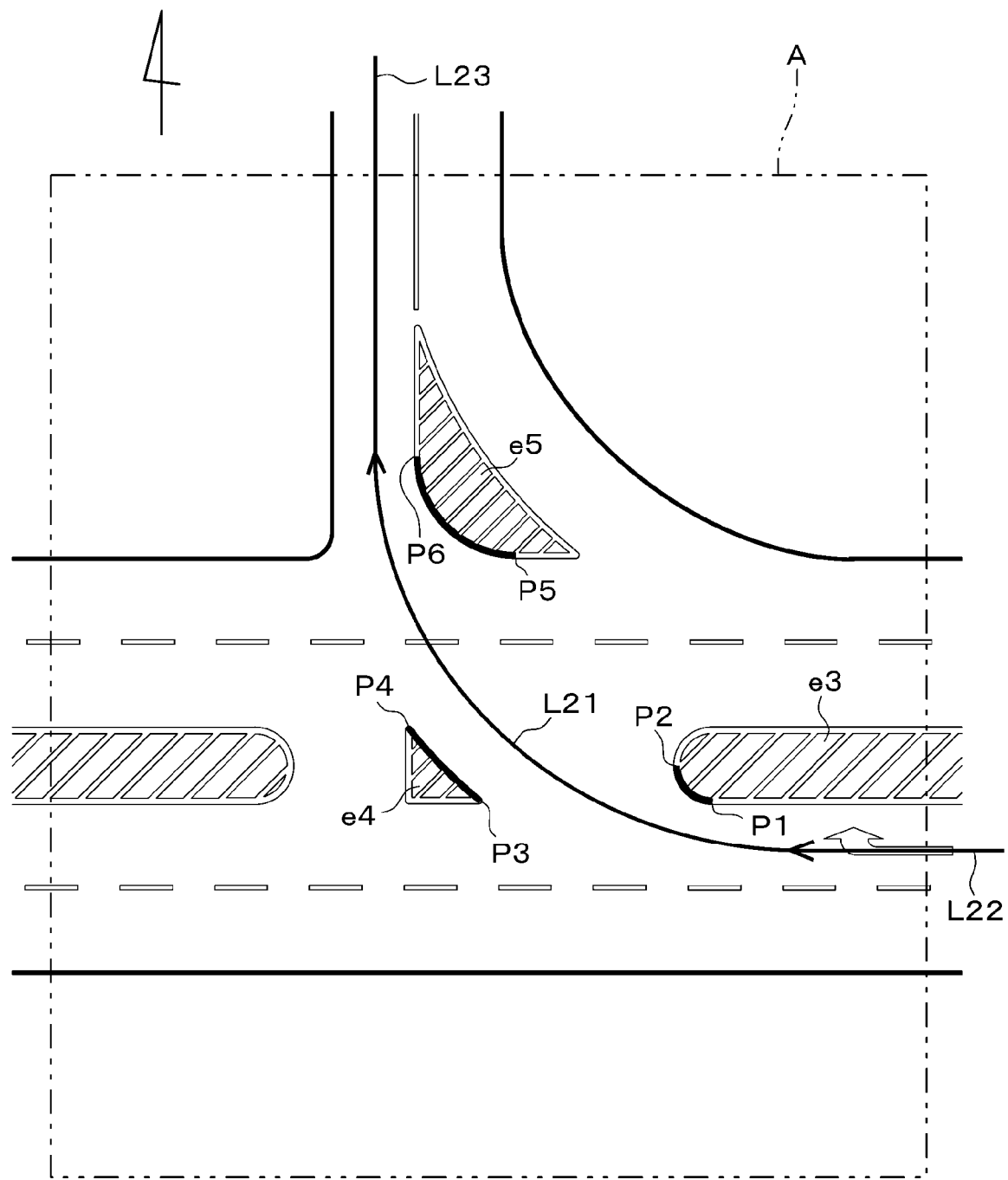
FIG. 13 is an illustration of travel trajectory data.

That is, as illustrated in FIG. 13, upon recognizing the striped areas e3 to e5 for the right turn only lane that enters the intersection from the east-direction, the controller 16 extracts frame portions of the recognized striped areas e3 to e5 that contribute to a right turn and recognizes shapes of the extracted frame portions. More specifically, the controller 16 recognizes shapes of the frame portion p1-p2 of the striped area e3, the frame portion p3-p4 of the striped area e4, and the frame portion p5-p6 of the striped area e5.

Upon recognizing the frame portions p1-p2, p3-p4, and p5-p6 of the striped areas e3 to e5, which contribute to a right turn, for the right turn only lane that enters the intersection from the east-direction, the controller 16 generates travel trajectory data L21 turning right within the intersection that follows the recognized frame portions p1-p2, p3-p4, and p5-p6. Upon generating the travel trajectory data L21, the controller 16 complements connections at both ends of the generated travel trajectory data L21 such that the travel trajectory data L21 is smoothly connected to the travel trajectory data between intersections L22 at the entrance-to-intersection end of the travel trajectory data L21 and the travel trajectory data L21 is smoothly connected to the travel trajectory data between intersections L23 at the exit-from-intersection end of the travel trajectory data L21, thereby correcting the shape and location of the travel trajectory data L21. Any methods, such as Lagrange interpolation, Newtonian interpolation, spline interpolation or the like, may be employed to complement the connections.

Figure 14:
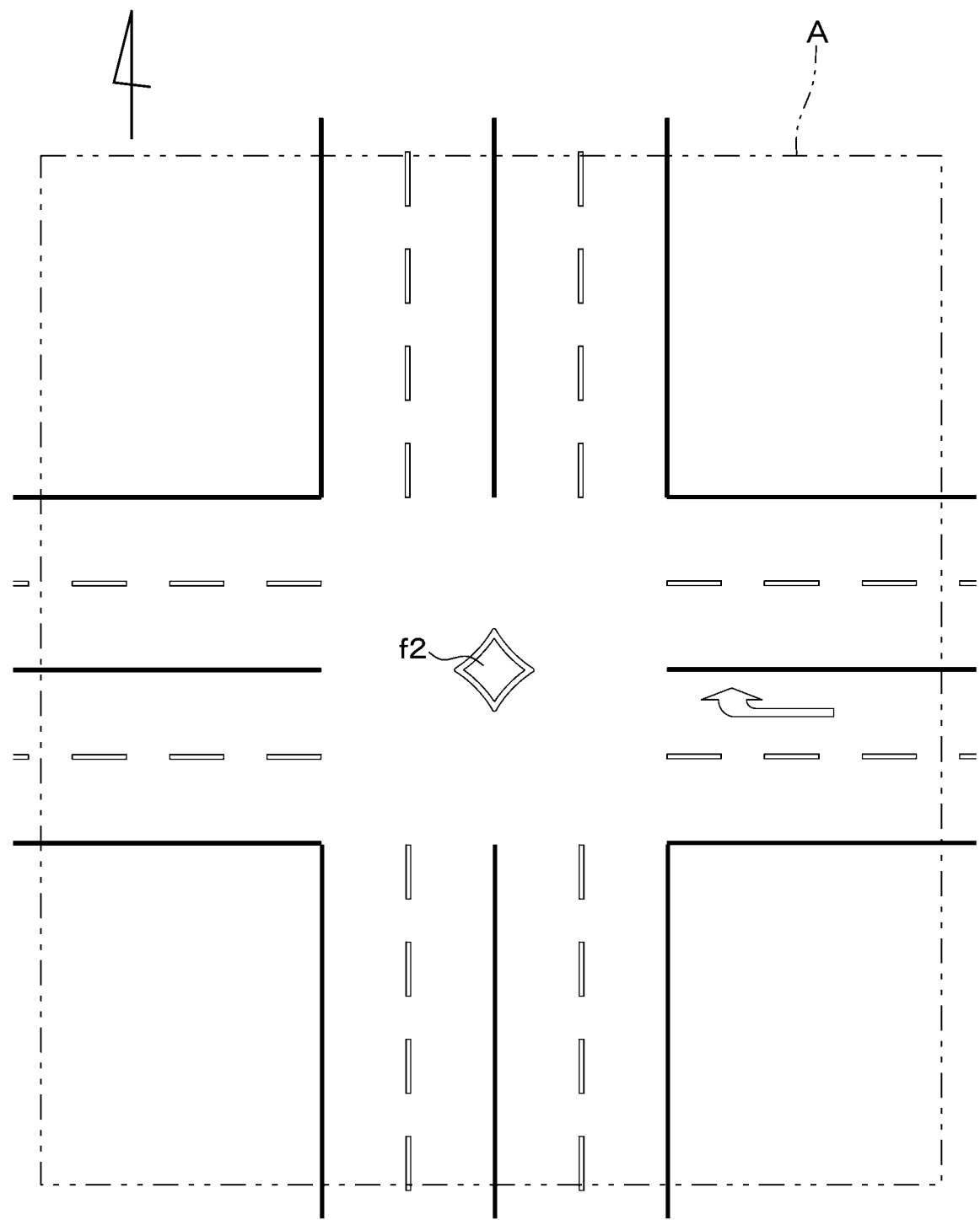
FIG. 14 is an illustration of a diamond-shaped marking in an intersection.

(4) Process of Generating Travel Trajectory Data by Recognizing a Diamond-Shaped Marking on a Road in an Intersection FIG. 14 illustrates an example of an intersection where the north-south direction road is a two-way road having two lanes for each direction and the east-west direction road is a two-way road having two lanes for each direction. The east-west direction road has a right turn only lane for each direction.

Figure 15:
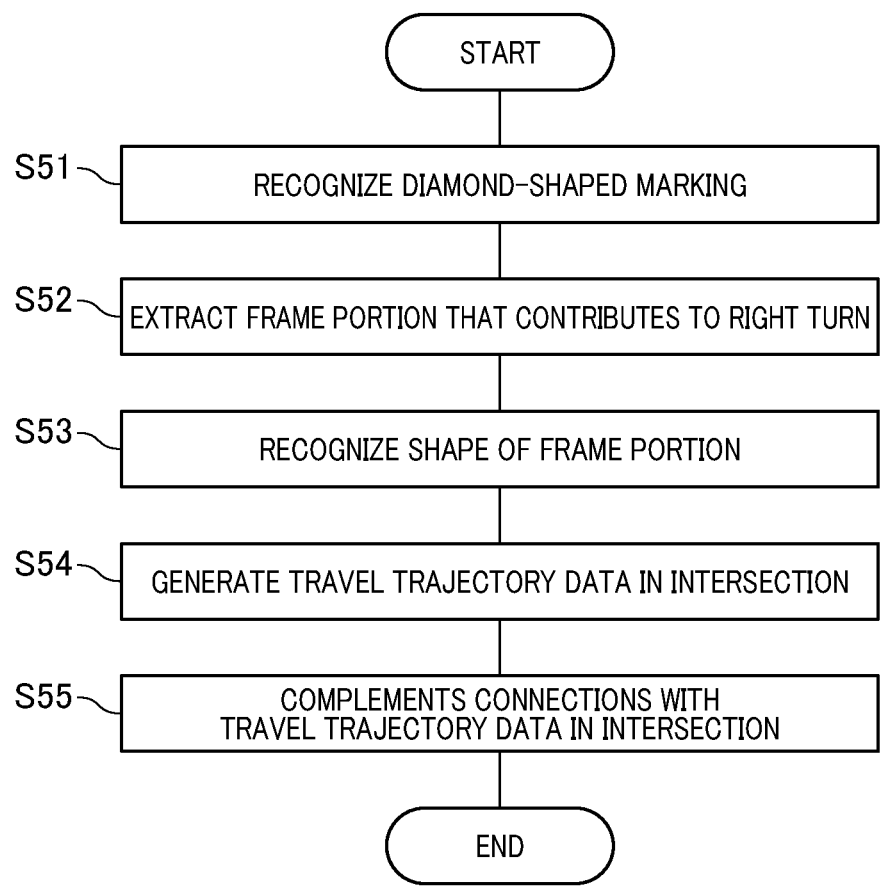
FIG. 15 is a flowchart of a process of generating travel trajectory data using a diamond-shaped marking.

As illustrated in FIG. 15, upon recognizing a diamond-shaped marking on a road in an intersection (at S51) by performing the recognition process, the controller 16 extracts a frame portion of the recognized diamond-shaped marking that contributes to a right turn (at S52). Upon extracting the frame portion of the recognized diamond-shaped marking that contributes to a right turn, the controller 16 recognizes a shape of the extracted frame portion (at S53) and generates the travel trajectory data in the intersection in response to a recognition result (at S54). Upon generating the travel trajectory data in the intersection, the controller 16 complements connections at both ends of the generated travel trajectory data such that the travel trajectory data is smoothly connected to the travel trajectory data between intersections at both the entrance-to-intersection end and exit-from-intersection end of the travel trajectory data, thereby correcting the shape and location of the travel trajectory data (at S55).

Figure 16:
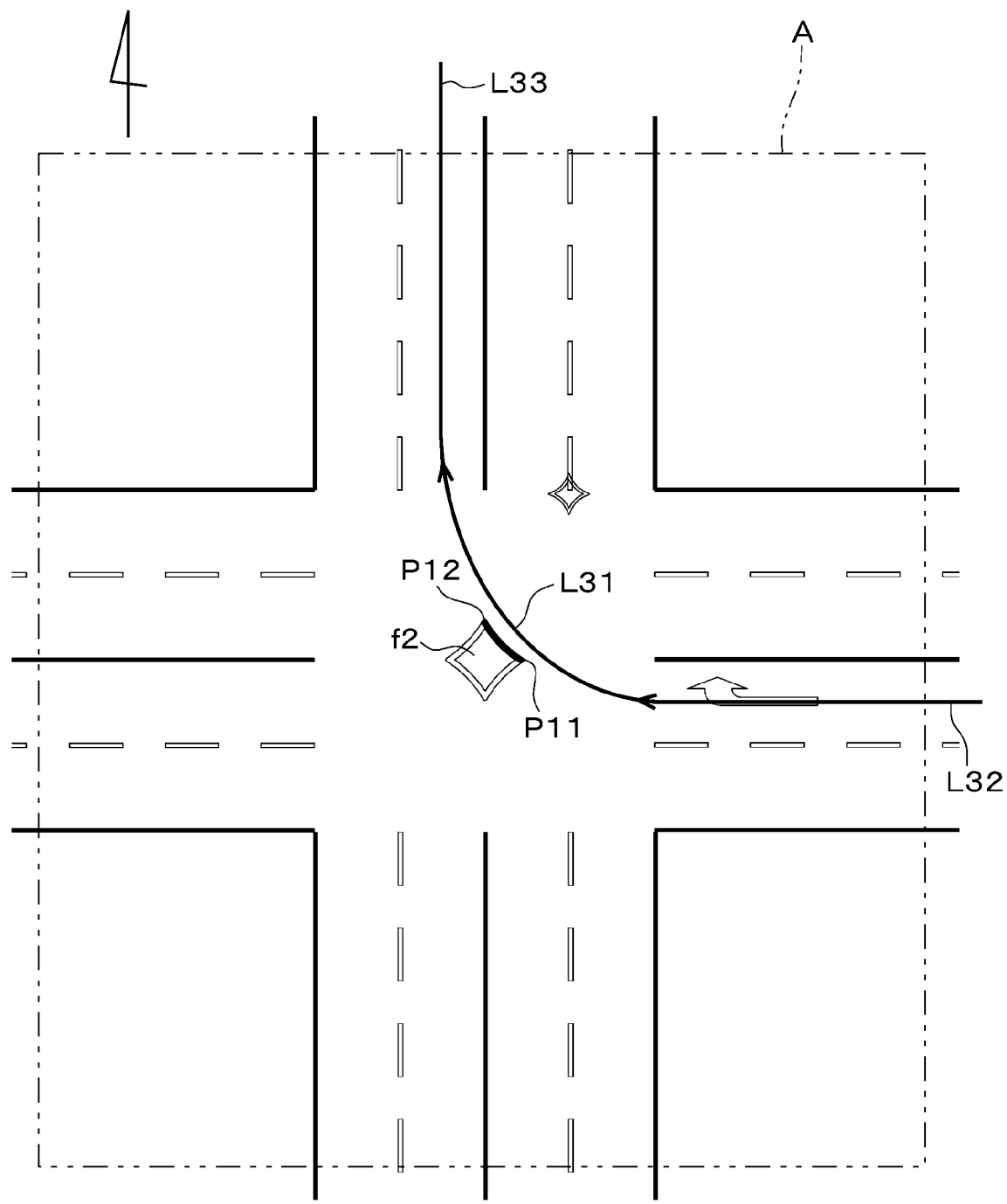
FIG. 16 is an illustration of travel trajectory data.

That is, as illustrated in FIG. 16, upon recognizing the diamond-shaped marking f2 for the right turn only lane that enters the intersection from the east-direction, the controller 16 extracts a frame portion of the recognized diamond-shaped marking f2 that contributes to a right turn and recognizes a shape of the extracted frame portion. More specifically, the controller 16 recognizes a shape of the frame portion p11-p12 of the diamond-shaped marking f2.

Upon recognizing the frame portion p11-p12 of the diamond-shaped marking f2, which contributes to a right turn, for the right turn only lane that enters the intersection from the east-direction, the controller 16 generates travel trajectory data L31 turning right within the intersection that follows the recognized frame portion p11-p12. Upon generating the travel trajectory data L31, the controller 16 complements connections at both ends of the generated travel trajectory data L31 such that the travel trajectory data L31 is smoothly connected to the travel trajectory data between intersections L32 at the entrance-to-intersection end of the travel trajectory data L31 and the travel trajectory data L31 is smoothly connected to the travel trajectory data between intersections L33 at the exit-from-intersection end of the travel trajectory data L31, thereby correcting the shape and location of the travel trajectory data L31. Any methods, such as Lagrange interpolation, Newtonian interpolation, spline interpolation or the like, may be employed to complement the connections.

In the above, it has been assumed that the vehicle is traveling in an area to which a road traffic act that regulates left-hand traffic is applied. Instead, it may be assumed that the vehicle is traveling in an area to which a road traffic act that regulates right-hand traffic is applied. In this case, the vehicle has to cross oncoming lanes to make a left turn. The controller 16 may therefore generate travel trajectory data turning left within an intersection. In addition, in the above, a line marking, an area of specific color, a striped area, and a diamond-shaped marking on a road in an intersection are individually recognized. Instead, a line marking, an area of specific color, a striped area, and a diamond-shaped marking on a road in an intersection may be recognized in combination to generate travel trajectory data.

Figure 17:
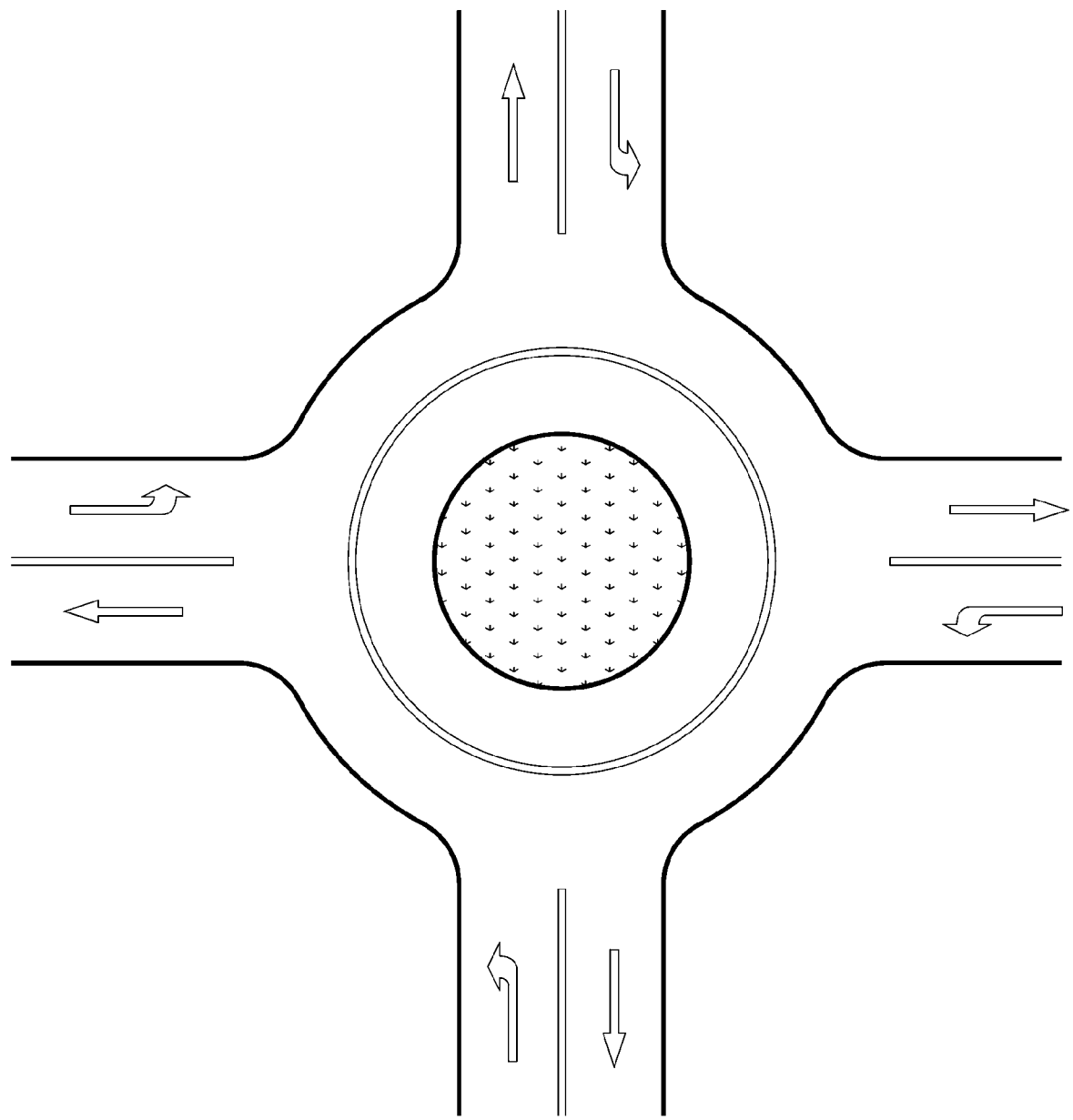
FIG. 17 is an illustration of a roundabout.
Figure 18:
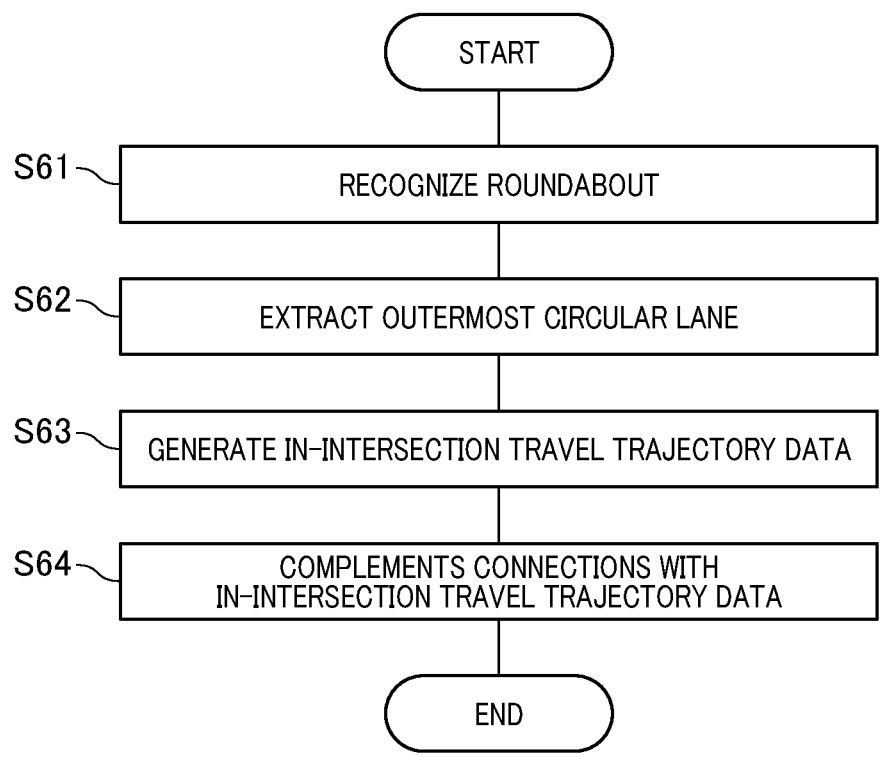
FIG. 18 is a flowchart of a process of generating travel trajectory data in a roundabout.

Also when recognizing a roundabout, the controller 16 generates travel trajectory data in the outermost circular lane of the roundabout. FIG. 17 illustrates an example where the roundabout is connected to roads in four directions. As illustrated in FIG. 18, upon recognizing a roundabout by performing the recognition process (at S61), the controller 16 extracts the outermost circular lane of the recognized roundabout (at S62). The controller 16 generates clockwise travel trajectory data in the extracted outermost circular lane (at S63). Upon generating travel trajectory data in the intersection, the controller 16 complements connections at predefined positions (eight positions) along the generated travel trajectory data such that the travel trajectory data is smoothly connected to the travel trajectory data between intersections at both the entrance-to-intersection end and exit-from-intersection end of the travel trajectory data, thereby correcting the shape and location of the travel trajectory data (at S64).

Figure 19:
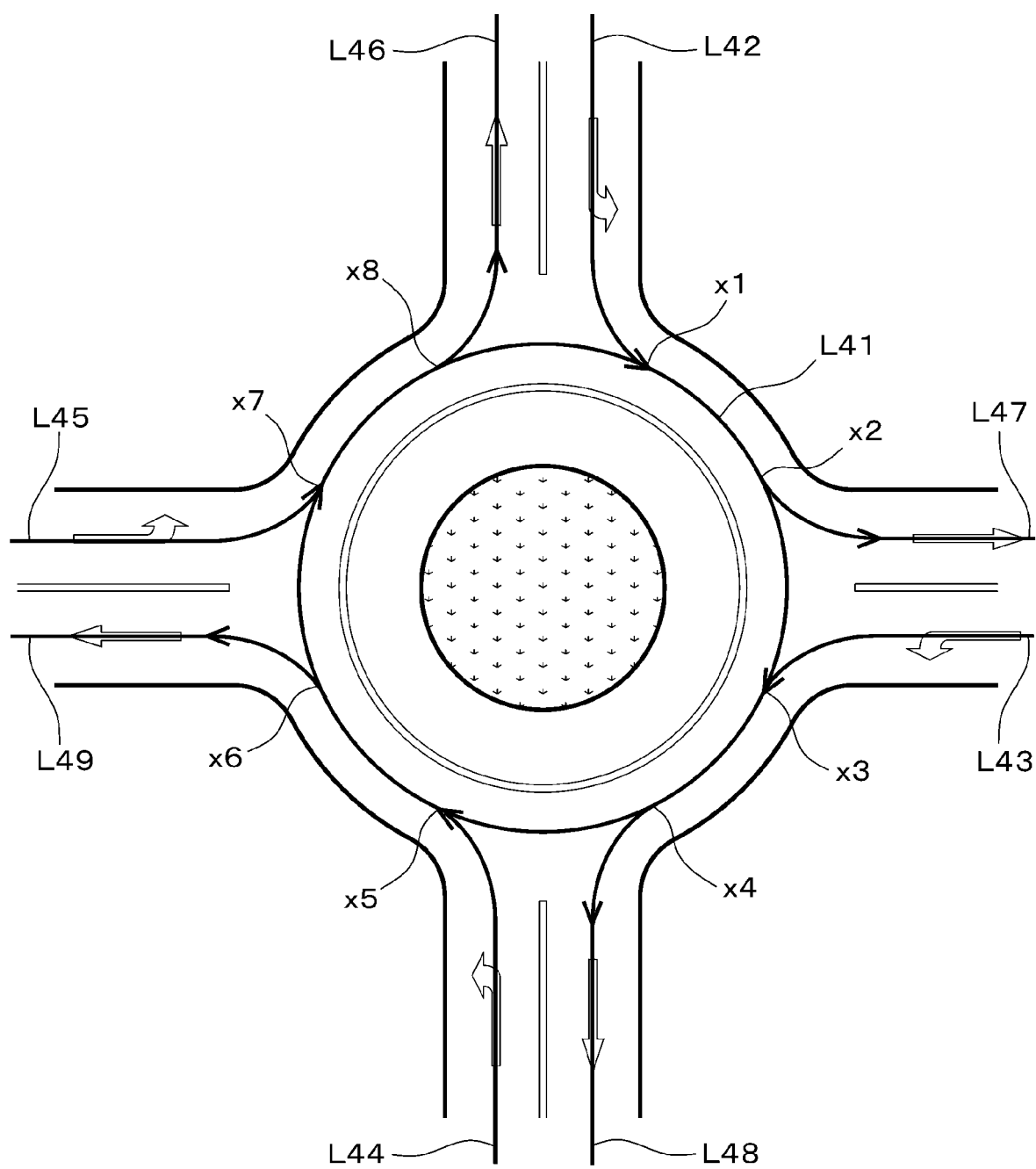
FIG. 19 is an illustration of travel trajectory data.

As illustrated in FIG. 19, the controller 16 generates clockwise travel trajectory data L41 in the outermost circular lane of the roundabout. Upon generating the travel trajectory data L41, the controller 16 complements connections at predefined positions (eight positions x1 to x8 illustrated in FIG. 19) along the generated travel trajectory data L41 such that the travel trajectory data L41 is smoothly connected to the travel trajectory data between intersections L42 to L45 at the entrance-to-intersection points and the travel trajectory data L41 is smoothly connected to the travel trajectory data between intersections L46 to L49 at the exit-from-intersection points, thereby correcting the shape and location of the travel trajectory data L41. In this case as well, the technique for complementing connections may be any technique, such as Lagrange interpolation, Newtonian interpolation, spline interpolation or the like. As above, it has been assumed that the vehicle is traveling in an area to which a road traffic act that regulates left-hand traffic is applied. Instead, it may be assumed that the vehicle is traveling in an area to which a road traffic act that regulates right-hand traffic is applied, where the controller 16 generates counterclockwise travel trajectory data in the outermost circular lane of the roundabout.

The present embodiment set forth above can provide the following advantages.

The controller 16 recognizes channelizing strips on a road in an intersection from aerial photo data, satellite photo data, and vehicle image data, and generates travel trajectory data in the intersection for autonomous driving in response to a recognition result. Where channelizing strips are actually existing on a road in an intersection, generating the travel trajectory data in the intersection for autonomous driving in response to the actually existing channelizing strips enables appropriate generation of travel trajectory data in the intersection for autonomous driving.

The controller 16 recognizes line markings on a road in an intersection as channelizing strips and generates travel trajectory data that follows the recognized line markings. With this, for an intersection where line markings are painted, the travel trajectory data in the intersection for autonomous driving can appropriately be generated.

The controller 16 recognizes areas of specific colors on a road in an intersection as channelizing strips and generates travel trajectory data that follows the recognized areas. With this, for an intersection where areas of specific colors are painted, the travel trajectory data in the intersection for autonomous driving can appropriately be generated.

The controller 16 recognizes striped areas in an intersection as channelizing strips and generates travel trajectory data that follows shapes of the striped areas. With this, for an intersection where striped areas are painted, the travel trajectory data in the intersection for autonomous driving can appropriately be generated.

The controller 16 recognizes a diamond-shaped marking in an intersection as channelizing strips and generates travel trajectory data that follows a shape of the diamond-shaped marking. With this, for an intersection where a diamond-shaped marking is painted, the travel trajectory data in the intersection for autonomous driving can appropriately be generated.

The controller 16 performs, as a pre-detection process, brightness adjustment, roadside tree masking, and vehicle detection, and recognizes channelizing strips on a road in an intersection from aerial photo data, satellite photo data, and vehicle image data that were processed in the pre-detection process. Performing the pre-detection process allows the channelizing strips to be recognized after removing unnecessary information, and can improve the accuracy of recognition of channelizing strips.

The controller 16 performs, as a detection process, white-line intensity calculation, noise masking, white-line center detection, and white-line information generation, and recognizes channelizing strips on a road in an intersection from aerial photo data, satellite photo data, and vehicle image data that were processed in the detection process. Performing the detection process allows the channelizing strips to be recognized after emphasizing necessary information and removing unnecessary information, and can improve the accuracy of recognition of channelizing strips.

The present disclosure is described in compliance with the embodiments. However, it should be appreciated that the present disclosure is not limited to the embodiments set forth above or the structures thereof. The present disclosure encompasses various modified examples and modifications within the range of equivalency. In addition, the scope of the present disclosure and the range of ideas thereof include various combinations and forms and other combinations and forms additionally including one or more elements or a portion of one element.

The channelizing strips may be recognized using any one of the aerial photo data, the satellite photo data, and the vehicle image data, or may be recognized using all of them.

In the exemplary embodiment set forth above, the vehicle image data is transmitted from the vehicle-mounted device 2 to the map data generation device 3. In the map data generation device 3, the vehicle image data received from the vehicle-mounted device 2 is image-recognized. In an alternative embodiment, some or all of the image recognition process performed by the map data generation device 3 may be performed by the vehicle-mounted device 2. That is, in the vehicle-mounted device 2, for example, the vehicle image data is image-recognized to generate analysis result data indicating location coordinates and installation modes of the road markings, such as the channelizing strips or the like. The generated analysis result data may be transmitted to the map data generation device 3. In the map data generation device 3, road information data and travel trajectory data may be generated using the analysis result data received from the vehicle-mounted device 2. With the configuration where the analysis result data is transmitted from the vehicle-mounted device 2 to the map data generation device 3, an amount of data communication from the vehicle-mounted device 2 to the map data generation device 3 can be suppressed and the processing load of the map data generation device 3 can be reduced.

The configuration is not limited to the configuration where the brightness adjustment, the roadside tree masking and the vehicle detection are performed as the pre-detection process, but any of them may be performed, or another process may be performed as the pre-detection process.

The configuration is not limited to the configuration where the white line intensity calculation, the noise masking, the white-line center detection, and the white-line information generation are performed as the detection process, but any of them may be performed, or another process may be performed as the detection process.

The shape of the intersection is not limited to the illustrated shape.

The controller and its method described in relation to the present disclosure may be implemented by a dedicated computer that is provided by forming a processor and a memory programmed to execute one or more functions embodied by a computer program. Otherwise, the controller and its method described in relation to the present disclosure may be implemented by a dedicated computer that is provided by forming a processor from one or more dedicated hardware logic circuits. Alternatively, the controller and its method described in relation to the present disclosure may be implemented by one or more dedicated computers that are formed by a combination of a processor and a memory programmed to execute one or more functions and one or more hardware logic circuits. The computer program may be stored as instructions to be executed by a computer in a computer-readable non-transitory tangible recording medium.

What is claimed is:

1. A device for generating travel trajectory data in an intersection, comprising:
   non-transitory memory including one or more computer programs stored thereon; and
   one or more processors executing the one or more computer programs to perform operations comprising:
      recognizing a channelizing strip which is a road marking for guiding driving of vehicles in the intersection using captured image data of the intersection; and
      in response to a result of recognizing the channelizing strip, generating travel trajectory data that is data enabling specification of a travel trajectory in the intersection for autonomous driving, the travel trajectory data being used to generate initial map data that is data integrating travel trajectory data corresponding to between intersections and travel trajectory data corresponding to within intersections.

2. The device according claim 1, wherein:
   the operations further comprise recognizing a line marking on a road in the intersection as the channelizing strip, and
   travel trajectory data that follows the line marking is generated.

3. The device according to claim 1, wherein:
the operations further comprise recognizing an area of specific color on a road in the intersection as the channelizing strip, and
travel trajectory data that follows the area of specific color is generated.

4. The device according to claim 1, wherein:
the operations further comprise recognizing a striped area on a road in the intersection as the channelizing strip, and
travel trajectory data that follows a shape of the striped area is generated.

5. The device according to claim 1, wherein:
the operations further comprise recognizing a diamond-shaped marking on a road in the intersection as the channelizing strip, and
travel trajectory data that follows a shape of the diamond-shaped marking is generated.

6. The device according to claim 1, wherein:
the operations further comprise recognizing an arrow on a road in the intersection, and
travel trajectory data with reference to a direction indicated by the arrow is generated.

7. The device according to claim 1, wherein:
the operations further comprise recognizing a stop line on a road in the intersection, and
travel trajectory data with reference to a location of the stop line is generated.

8. The device according to claim 1, wherein:
the recognizing of the road marking in the intersection includes using, as the captured image data of the intersection, at least one of:
aerial photo data captured by a camera mounted to an aircraft,
satellite photo data captured by a camera mounted to a satellite, or
vehicle image data captured by a camera mounted to a vehicle.

9. The device according to claim 1, wherein:
the operations further comprise performing at least one of: brightness adjustment, roadside tree masking, or vehicle detection, as a pre-detection process, on the captured image data of the intersection, and
the recognizing of the road marking in the intersection includes using the image data on which the pre-detection process was performed.

10. The device according to claim 1, wherein:
the operations further comprise performing at least one of white-line intensity calculation, noise masking, white-line center detection, and white-line information generation, as a detection process, on the captured image data of the intersection, and
the recognizing of the road marking in the intersection includes using the image data on which the detection process was performed.

11. The device according to claim 1, wherein the operations further comprise delivering the travel trajectory data to a vehicle side.

12. The device according to claim 1, wherein:
the travel trajectory data includes at least one of: data indicating a virtual lane in the intersection, data used when a vehicle actually passes through the intersection during autonomous driving, or data used as terrestrial object data.

13. A method for generating travel trajectory data in an intersection, the method comprising:
recognizing a channelizing strip which is a road marking for guiding driving of vehicles in the intersection using captured image data of the intersection; and
in response to a result of recognizing the channelizing strip, generating travel trajectory data that is data enabling specification of a travel trajectory in the intersection for autonomous driving, in response to a result of recognition, the travel trajectory data being used to generate initial map data that is data integrating travel trajectory data corresponding to between intersections and travel trajectory data corresponding to within intersections.

14. A vehicle-mounted device comprising an autonomous driving controller configured to control autonomous driving of a vehicle using travel trajectory data determined according to a result of recognition of a channelizing strip which is a road marking for guiding driving of vehicles in an intersection from captured image data of the intersection, the travel trajectory data being data enabling specification of a travel trajectory in the intersection for autonomous driving and being included in initial map data that is data integrating travel trajectory data corresponding to between intersections and travel trajectory data corresponding to within intersections.

* * * * *